United States Patent [19]

Sarkissian

[11] 4,153,095
[45] May 8, 1979

[54] PNEUMATIC TIRE HAVING A PNEUMATIC SAFETY INSERT WITH BEADS

[75] Inventor: Berge Sarkissian, Waterbury, Conn.

[73] Assignee: Uniroyal, Inc., New York, N.Y.

[21] Appl. No.: 833,109

[22] Filed: Sep. 14, 1977

[51] Int. Cl.² ............... B60C 5/06; B60C 17/00; B60C 5/08
[52] U.S. Cl. ............ 152/340; 152/330 RF; 152/346; 152/361 R
[58] Field of Search ........ 152/155, 157, 158, 161–163, 152/339, 344, 340, 331, 330 RF, 330 L, 346, 347, 365, 362 R

[56] References Cited

U.S. PATENT DOCUMENTS

| 2,884,983 | 5/1959 | Cuesta | 152/346 |
| 3,025,902 | 3/1962 | Sanderson | 152/340 |
| 3,885,614 | 5/1975 | Fujikawa et al. | 152/340 |

OTHER PUBLICATIONS

Goodyear "Tires - TBA Merchandising" Jun. 1956.

Primary Examiner—Francis S. Husar
Assistant Examiner—Lawrence E. Williams
Attorney, Agent, or Firm—Philip Rodman

[57] ABSTRACT

A pneumatic insert for a pneumatic tire comprises a generally toroidal shaped hollow member having a pair of annular insert beads with sidewalls extending therefrom joined to an insert crown portion. An annular flap portion is joined to the outer surface of each insert sidewall at the bead area and extends beyond each bead a predetermined amount.

The pneumatic insert is disposed in a standard tire and mounted on standard rim. The insert flaps are tucked between the respective insert beads and the bead support surface of the rim to provide a leak-tight seal. When the insert is inflated the insert beads push the respective tire beads against the rim flange. In one embodiment the tire is inflated through an air passage member disposed between the tire and insert beads. In another embodiment the tire is inflated directly through the tire sidewall with a hypodermic needle. The insert inflation chamber and the tire inflation chamber do not communicate and can be inflated to different pressure levels.

Other embodiments of the pneumatic insert include fabric reinforcements and/or protective caps.

41 Claims, 28 Drawing Figures

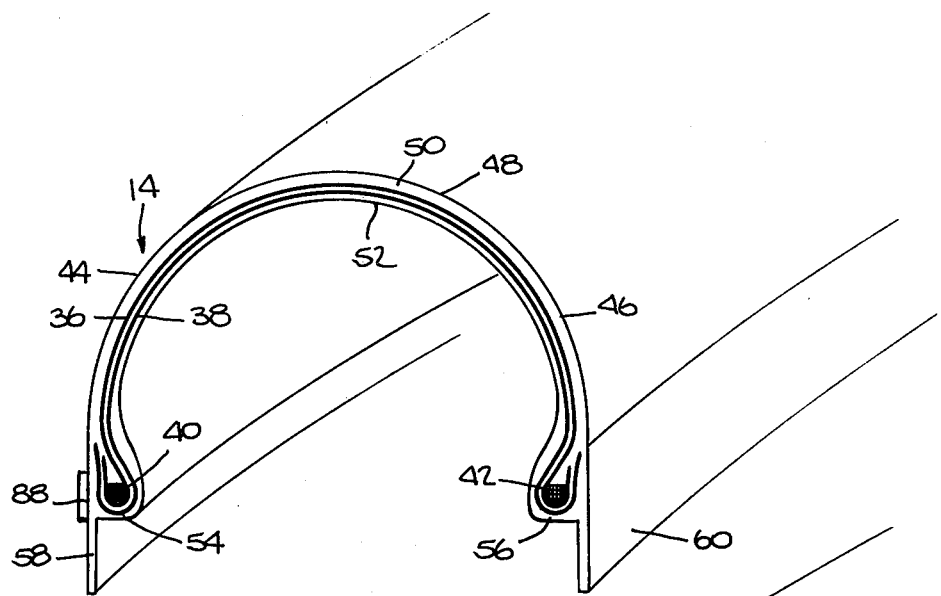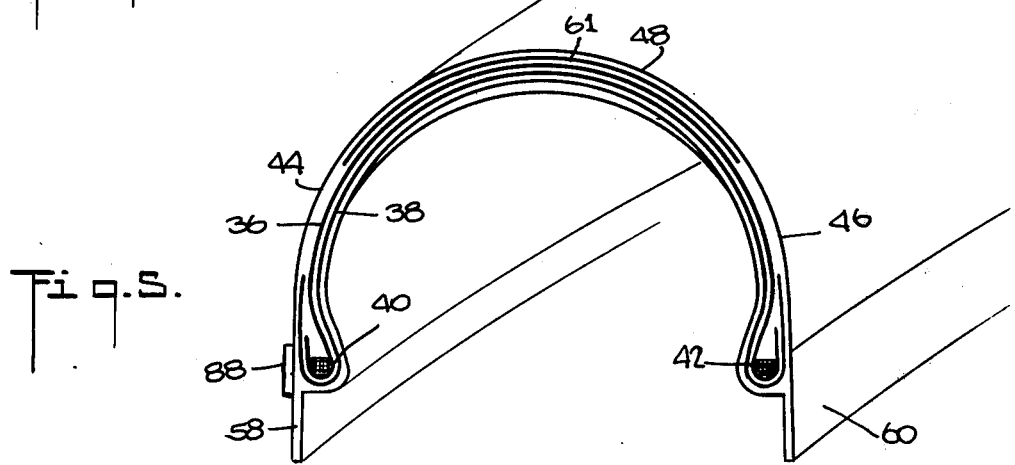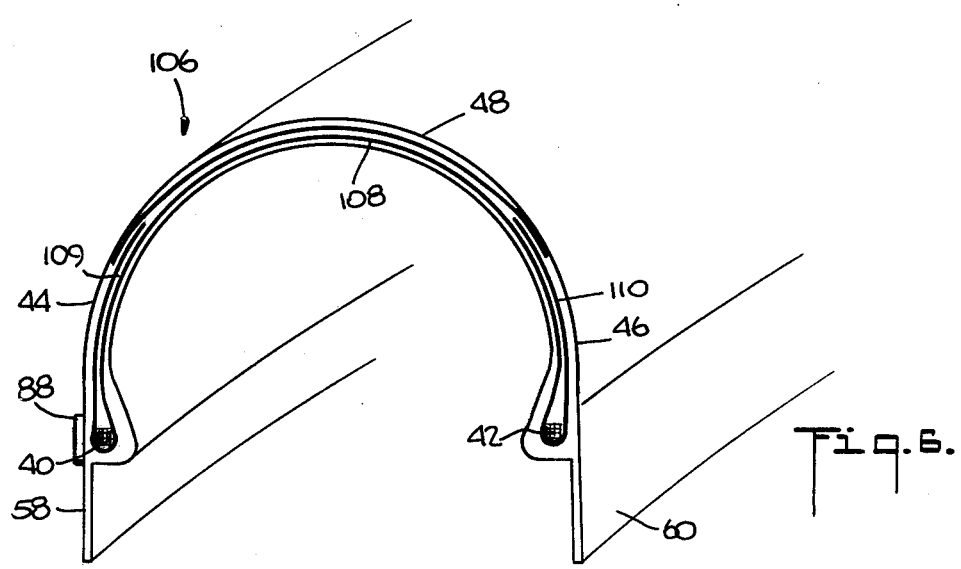

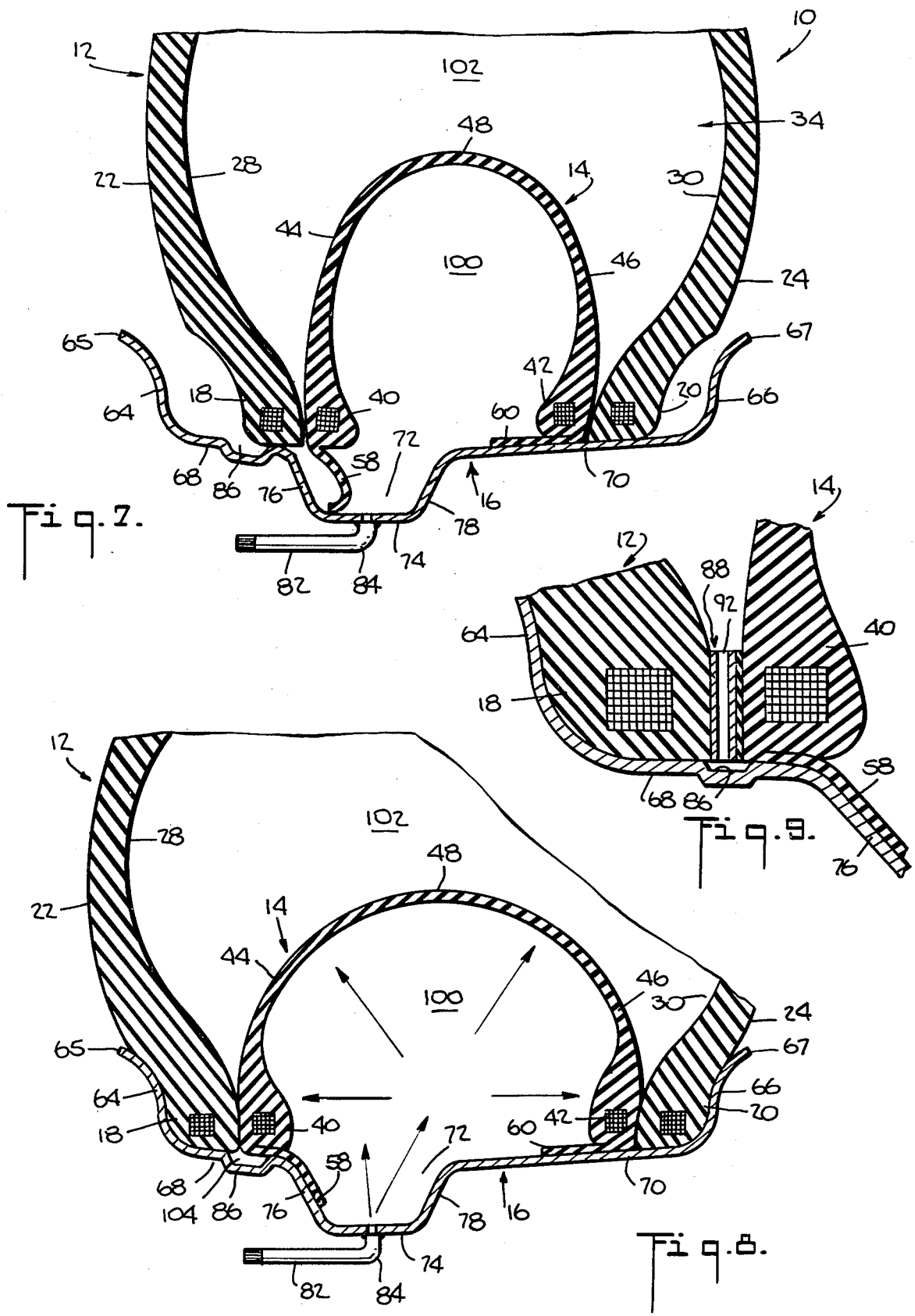

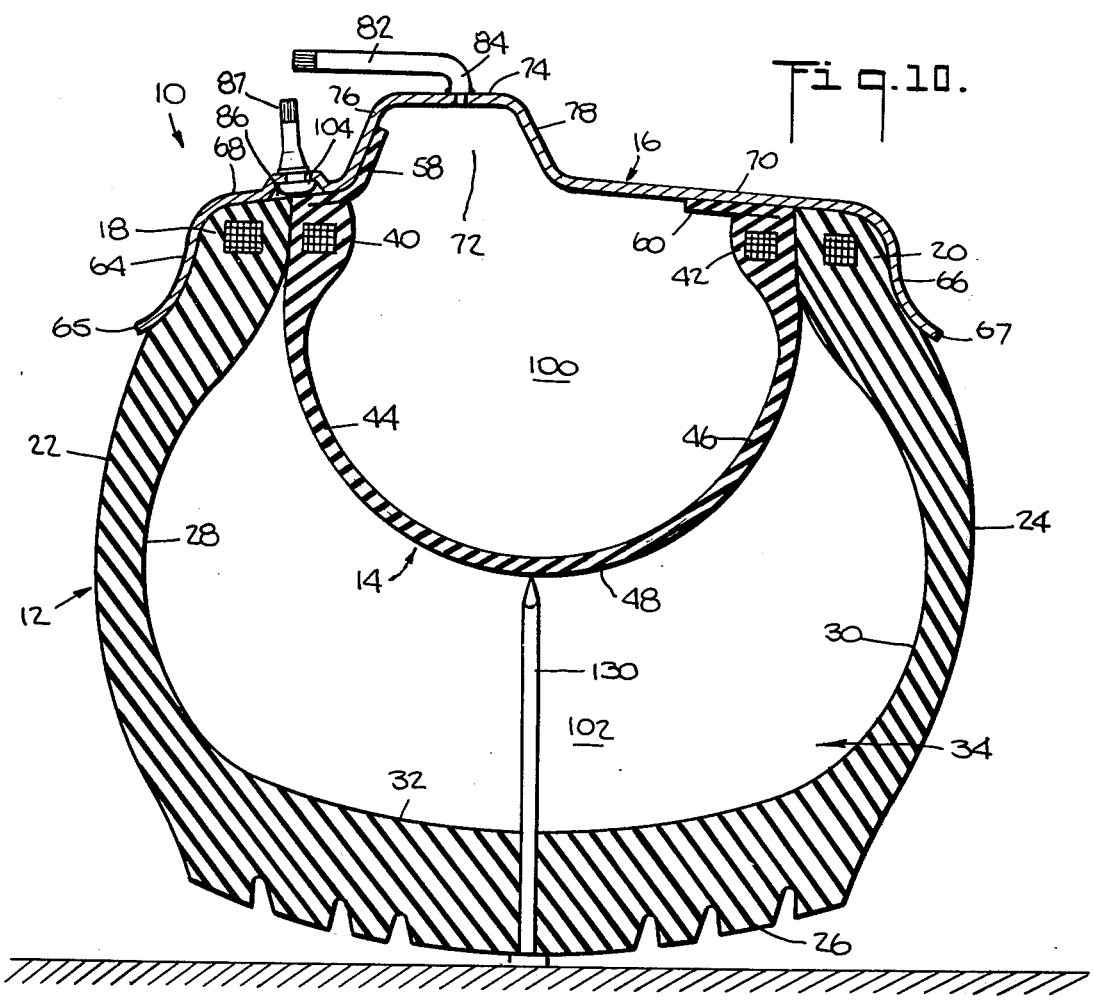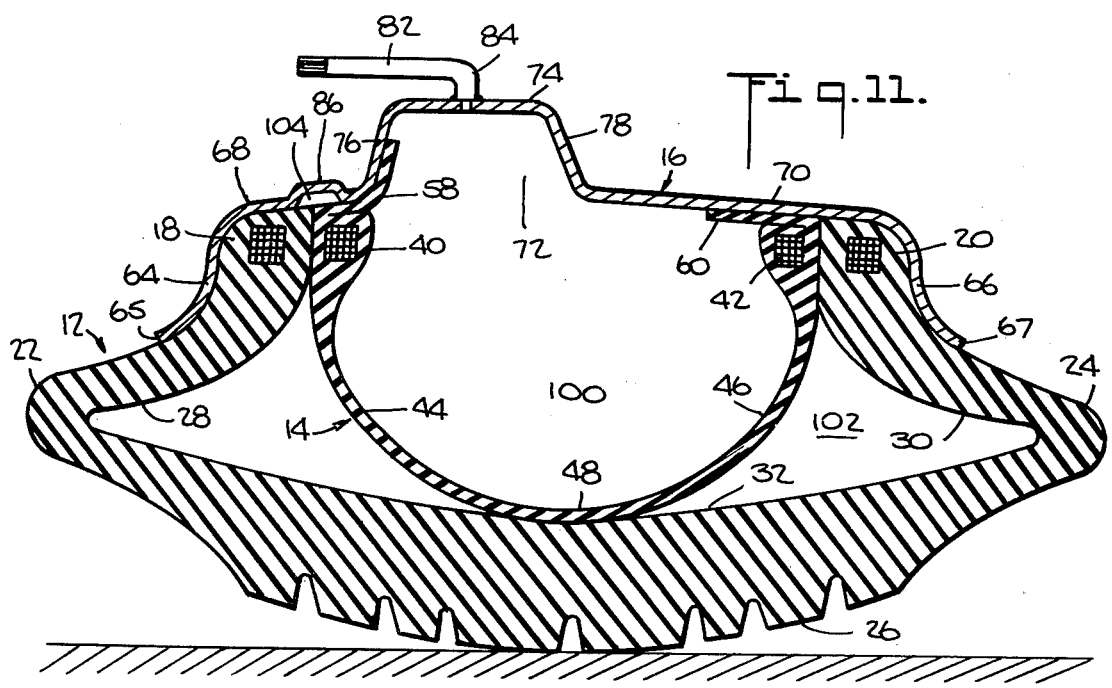

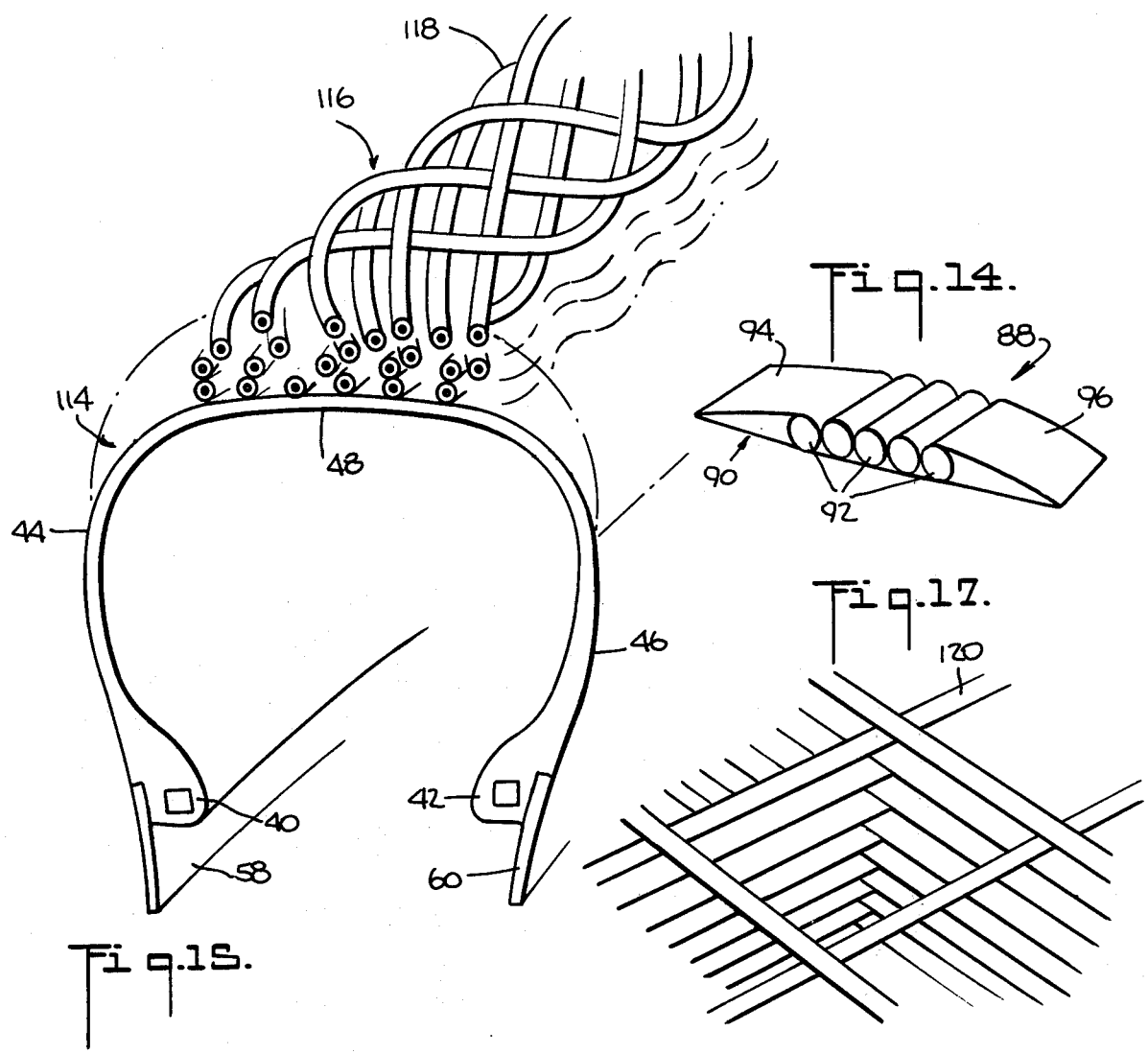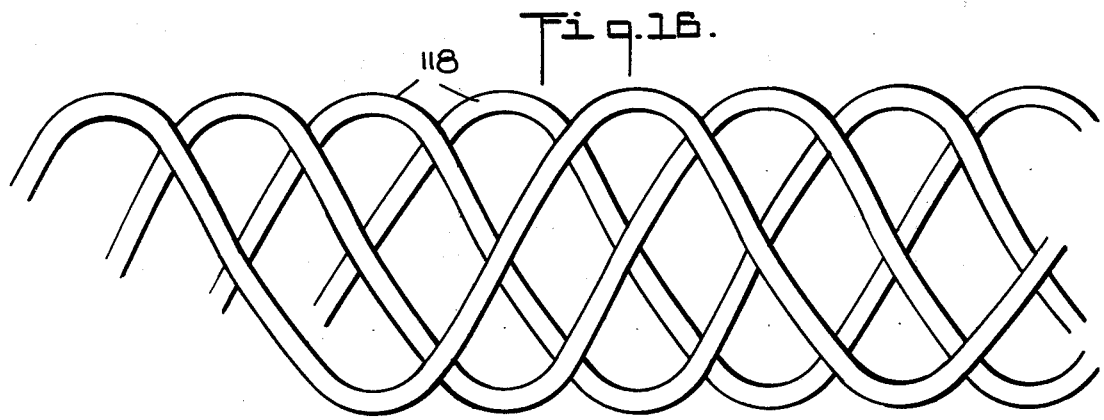

Fig.18.
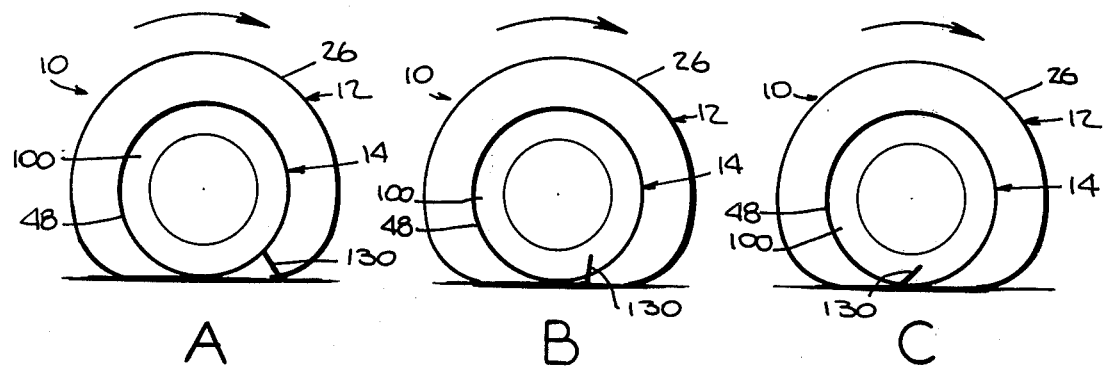
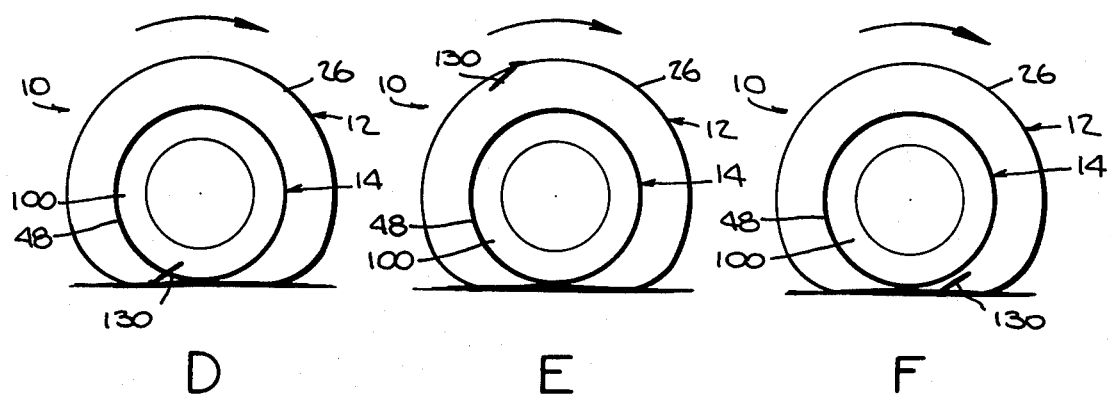
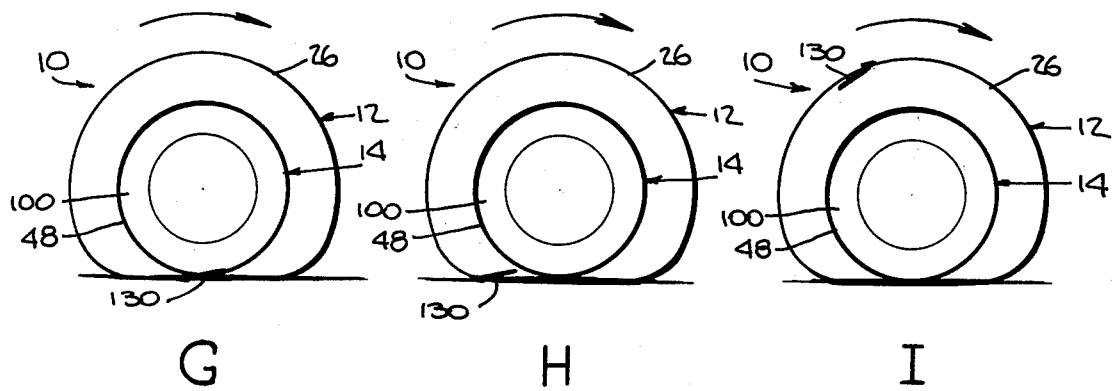

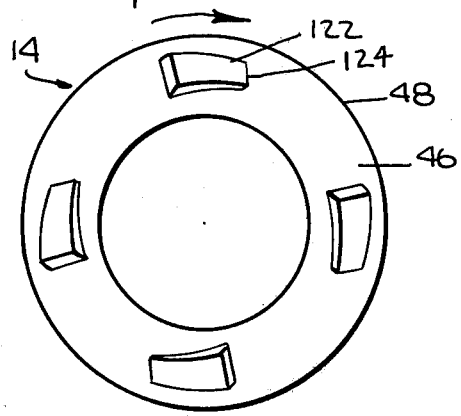
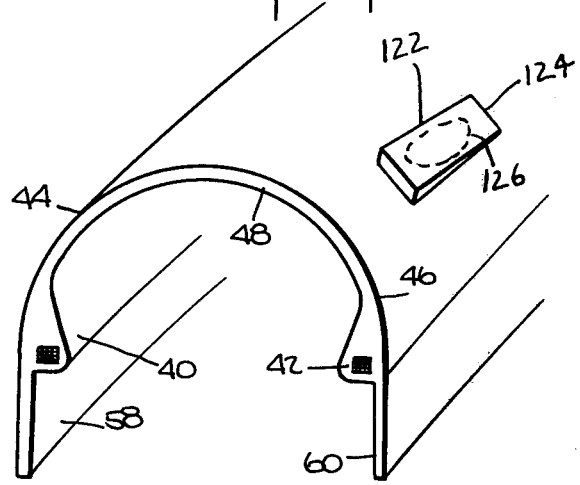
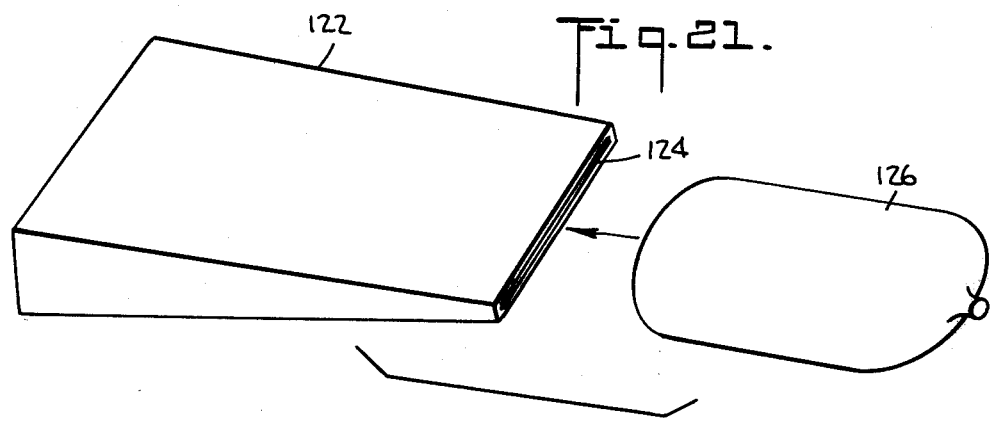
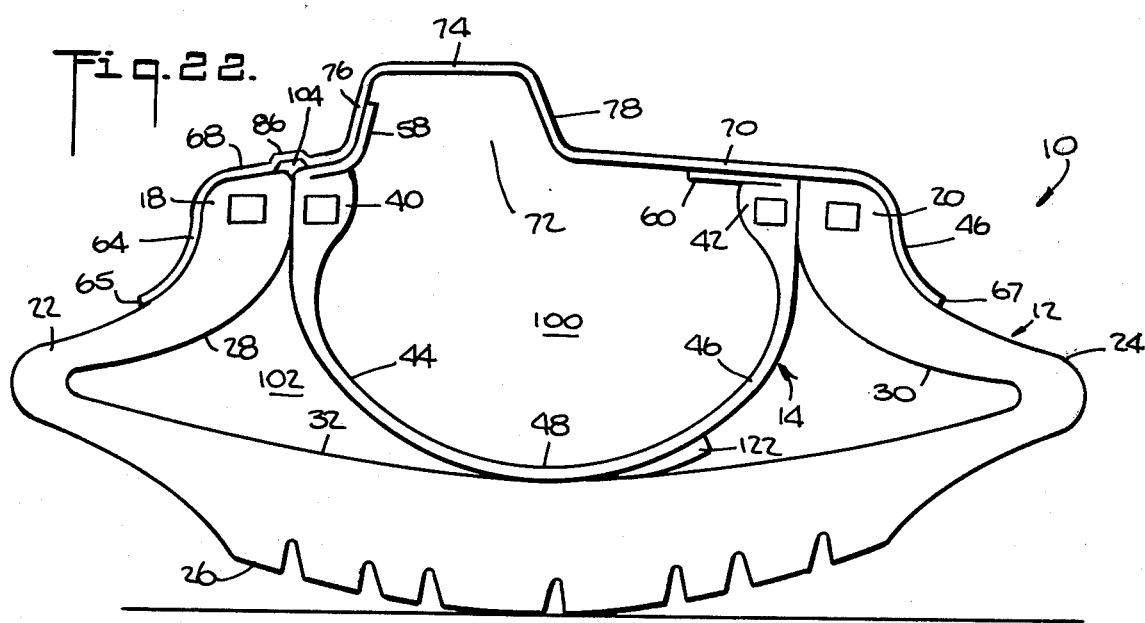

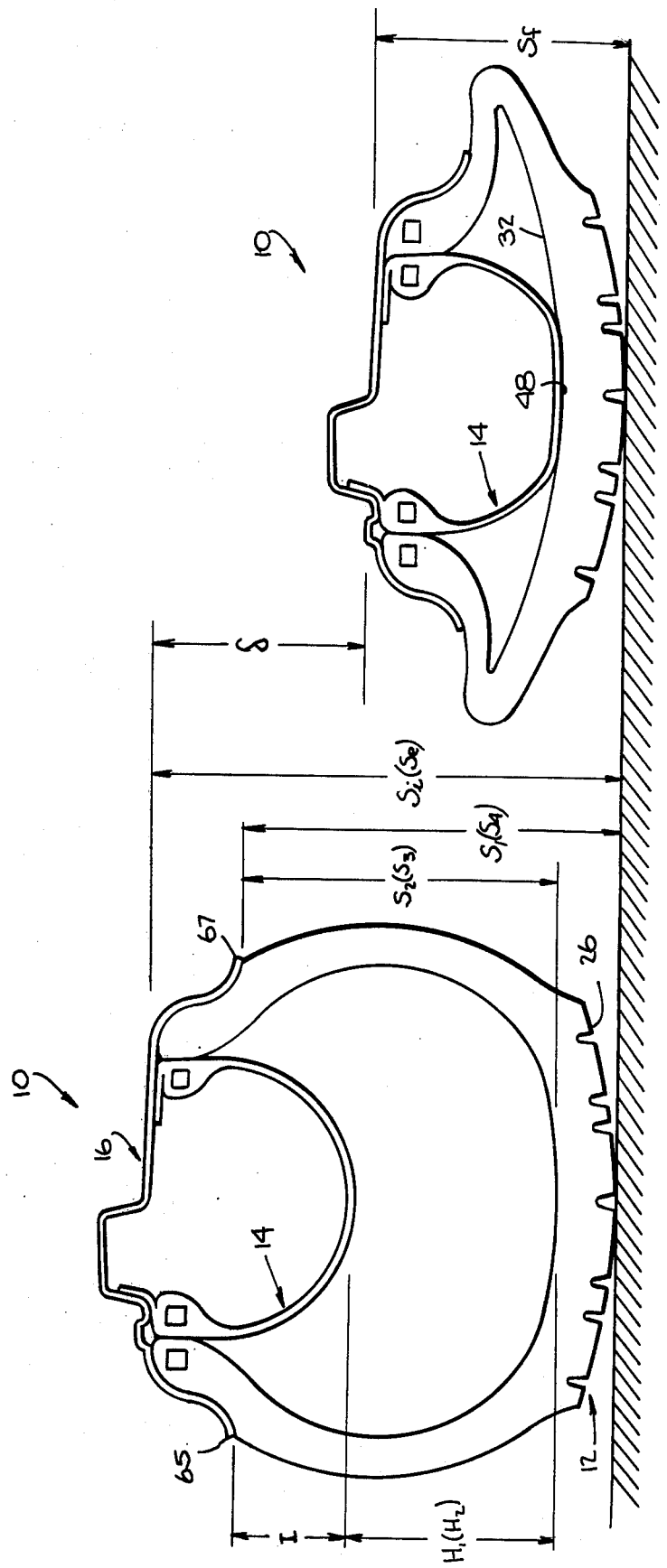

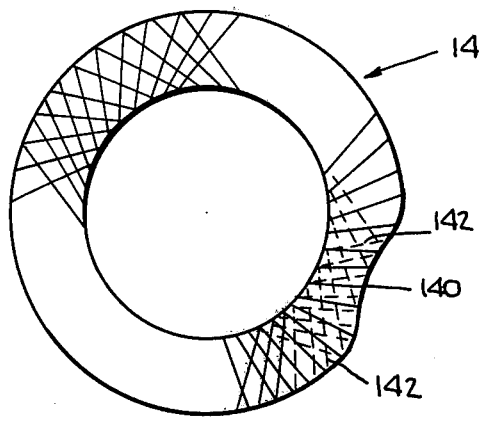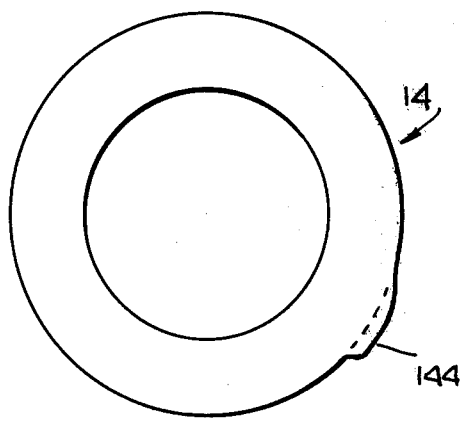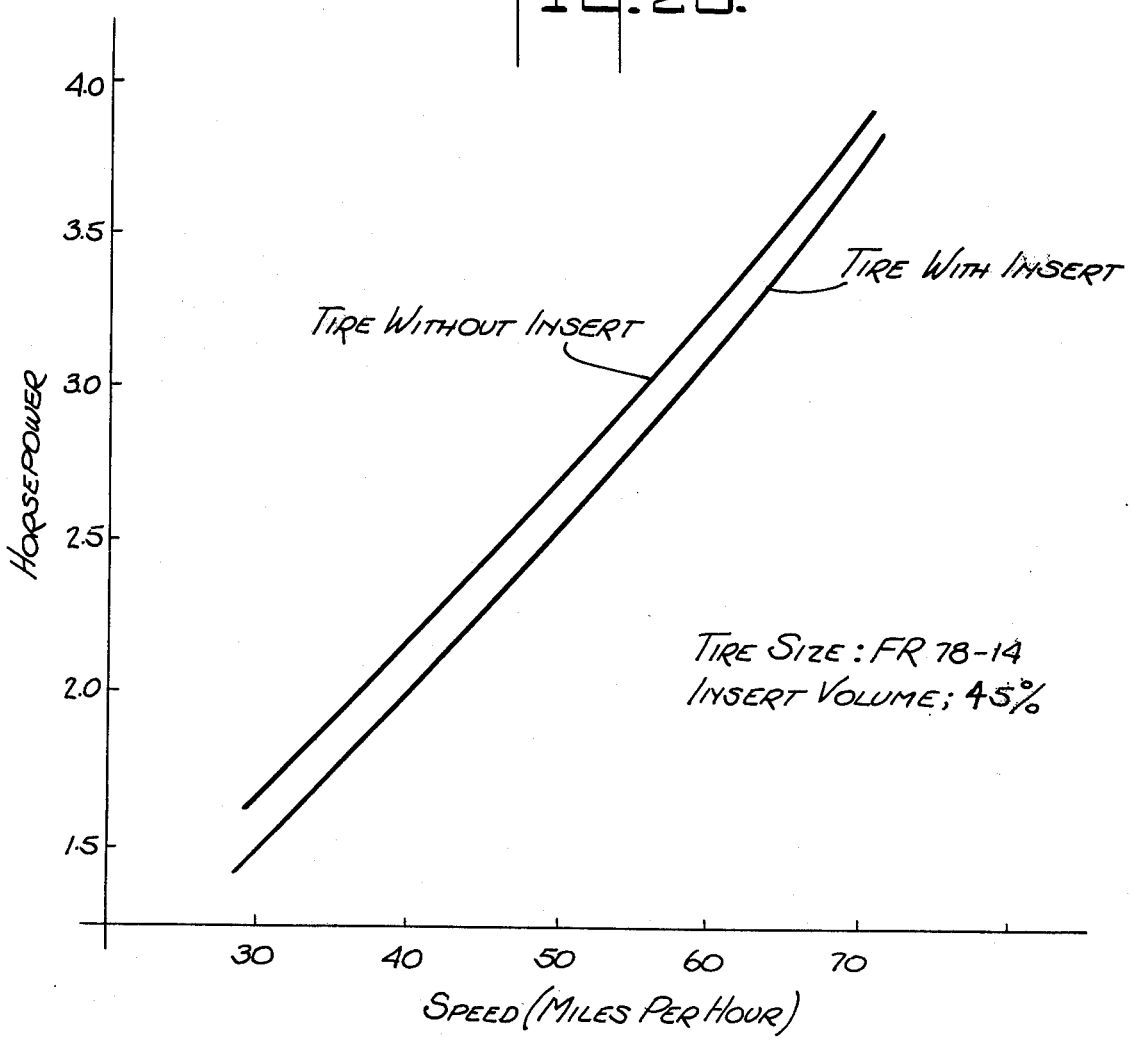

PNEUMATIC TIRE HAVING A PNEUMATIC SAFETY INSERT WITH BEADS

This invention is directed to pneumatic tires with run-flat capabilities and more particularly to a pneumatic tire having a pneumatic safety insert with beads.

The improvement of transportation reliability is a goal continuously sought by users as well as manufacturers of vehicles having pneumatic tires. Tire deflations that occur unexpectedly during vehicle use, due to punctures cuts, etc., are potentially hazardous and nearly always inconvenience the user. Attempts to control such hazardous conditions and minimize the associated inconvenience have led to the development of tires with a capability of remaining in useful operation during and after a substantial loss of air from the tire inflation chamber.

One known tire of this type such as shown in British Pat. No. 808,481 requires a special rim for supporting a pneumatic tire and a pneumatic safety insert. The disclosed arrangement also requires spacer members between the tire and insert, or an insert bead retainer on the rim, to permit separate inflation of the insert air chamber and the tire air chamber to different pressure levels.

Another known tire of this type such as shown in U.S. Pat. No. 2,754,876 permits communication between an insert air chamber and a tire air chamber. Consequently the escape of air from the tire leads to escape of air from the insert. Thus the insert is of small benefit when air leaks slowly from the tire and in the event of a blowout the vehicle must be used within a limited time range after pressure is lost from the tire air chamber.

Still another known tire of this type such as shown in U.S. Pat. No. 3,025,902 requires the tire beads to fit onto extensions of an insert to maintain an airtight inflation chamber within the insert. The forces borne by the tire beads during vehicle movement are thus transmitted to the insert risking damage to the insert before it must be depended upon.

Other known arrangements require adhesion between a tire and an insert to maintain proper positioning of the insert within the tire, or to provide an adequate leak-free seal of the insert air chamber.

It is thus desirable to provide a safety tire that incorporates a standard pneumatic tire having a separable pneumatic safety insert that can be mounted on a standard rim, and inflated to a pressure different from that of the tire without the use of adhesives, spacer members or special bead retainers.

Among the several objects of the present invention may be noted the provision of a novel safety tire incorporating a pneumatic insert with beads, a novel safety tire and rim assembly that provides separate non-communicable inflation chambers for the tire and insert, a novel safety tire and rim assembly wherein an airtight seal between a tire inflation chamber and an insert inflation chamber is maintained by flaps extending from beads on the pneumatic insert, a novel safety tire and rim assembly that incorporates a standard tire and a standard rim, and a novel pneumatic insert for a safety tire.

Other objects and features will be in part apparent and in part pointed out hereinafter.

The present invention relates to a novel safety tire incorporating a standard pneumatic tire and a separate pneumatic insert with beads having flaps extending therefrom, both of which can be mounted on a standard rim. The pneumatic insert, which is positioned within the tire cavity, is formed as a generally toroidal-shaped hollow member having a pair of axially spaced apart insert beads arranged to bear against the tire beads and the rim. The insert bead diameter is preferably greater than the tire bead diameter. Each outer sidewall surface of the insert includes an annular flap portion extending beyond each insert bead. The flaps are tucked between the respective insert beads and the support surface of the rim and function as gasket seals between the insert beads and the support surface. The flaps also overlay the support surface and are pressed thereagainst by the air pressure within the insert inflation chamber to enhance the leak-tight seal of the insert against the rim support surface. A tire inflation chamber defined between the tire and the pneumatic insert is non-communicable with the insert inflation chamber.

A first air valve member secured to the rim at the base of the wheel well inflates the pneumatic insert to spread the insert beads against the tire beads in substantially leak-tight surface to surface contact. A tire inflation chamber is thus defined between the tire and the pneumatic insert. An air passage channel formed in the support surface of the rim aligns with the plane of contact between one of the tire beads and one of the insert beads, thereby defining an air passage duct. An air passage fixture is sandwiched between the contacting tire and insert beads, in alignment with the air passage channel. The air passage fixture has at least one through opening communicating with the air passage duct and the tire inflation chamber.

A second air valve member is secured to the rim at the base of the air passage channel, but not necessarily in alignment with the air passage fixture. Air entering the second air valve passes into the air passage duct and through the opening of the air passage fixture into the tire inflation chamber.

In another embodiment of the invention, the tire air chamber is inflated through a removable hypodermic needle inserted in the tire sidewall at a predetermined location that is backed with puncture sealant material. The air passage channel, the air passage fixture and the second valve member can thus be eliminated.

The inner surface of the pneumatic insert can also include puncture sealant material and the outer crown surface can be layered with tear resistant fabric. A protective cap such as a filament wound material that prevents entry of nails into the pneumatic insert can also be provided on the insert crown. Suitable lubricants are provided between the insert and the tire.

When a tire deflation occurs, the air escaping from the tire inflation chamber causes the road contacting portion of the tire tread to flatten against the insert crown which provides support for the tread. Air does not escape from the insert air chamber because it does not normally communicate with the tire air chamber. The tire can thus be run in its flattened condition for approximately 45 miles at speeds exceeding 45 miles per hour, and longer distances at lower speeds.

The invention accordingly comprises the constructions hereinafter described, the scope of the invention being indicated in the following claims.

In the accompanying drawings in which various possible embodiments of the invention are illustrated, FIG. 1 is a sectional view showing a safety tire and rim assembly incorporating one embodiment of the present invention;

FIG. 4 shows a section of a pneumatic insert used in the assembly of FIG. 1;

FIGS. 5 and 6 show other embodiments of the pneumatic insert of FIG. 4;

FIGS. 7 and 8 show the tire and pneumatic insert being mounted on the rim;

FIG. 9 is a sectional view taken on the line 9—9 of FIG. 3;

FIGS. 10 and 11 show the assembly before and after tire failure;

FIG. 14 is a perspective view of an air passage member;

FIG. 15 shows another embodiment of the pneumatic insert with a filament wound protective cap;

FIG. 16 is a plan view of the protective cap of FIG. 15;

FIG. 17 is another embodiment of a filament wound protective cap;

FIG. 18 shows the dynamics of a nail entering the safety tire and rim assembly;

FIGS. 19-22 show a lubrication system for the safety tire and rim assembly;

Figure 27:
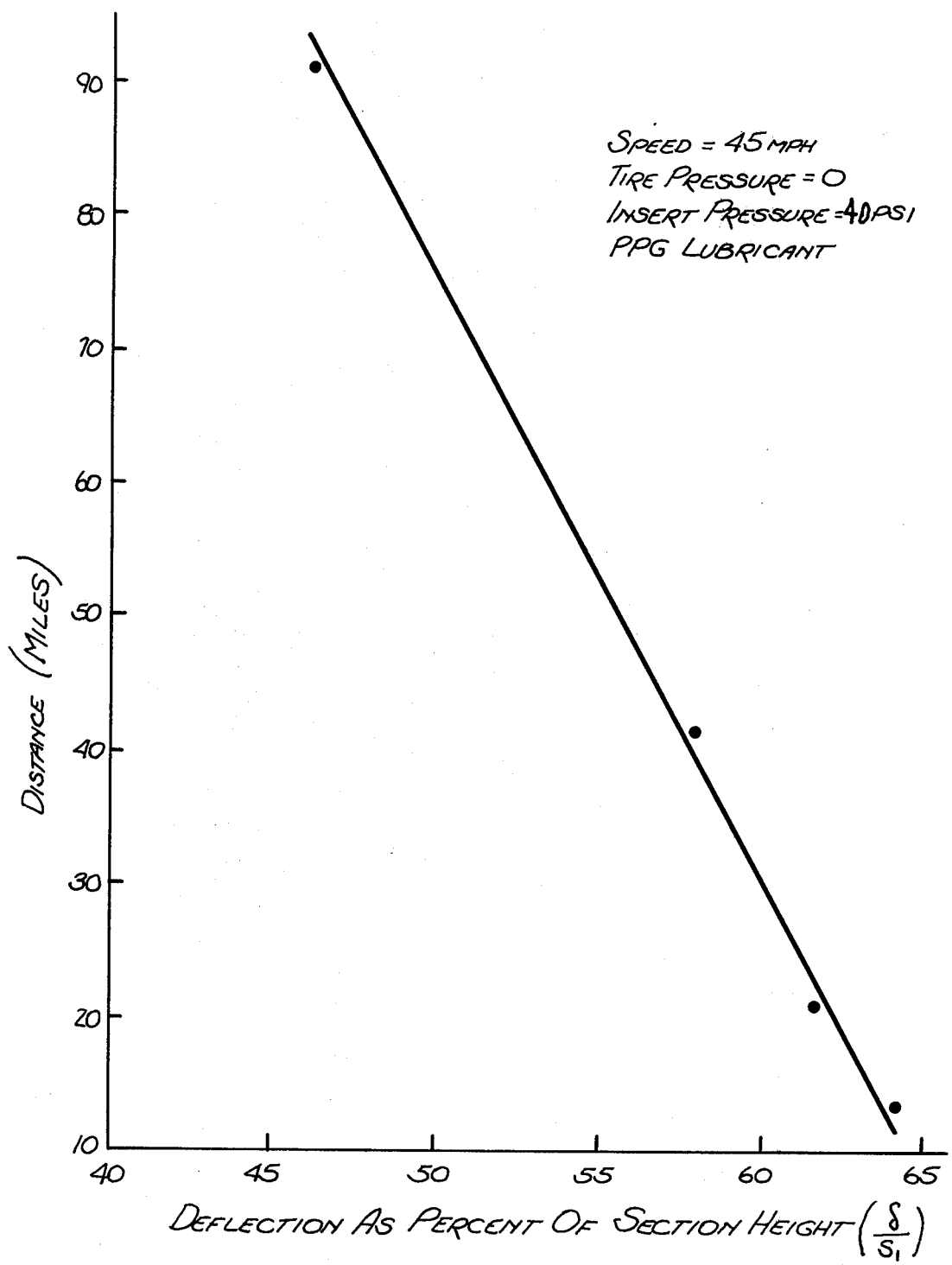

FIGS. 23 and 24 compare the dimensions of the safety tire and rim assembly before and after tire failure;

FIGS. 25 and 26 show run-flat warning devices incorporated in the pneumatic insert; and FIGS. 27 and 28 are data graphs.

Figure 1:
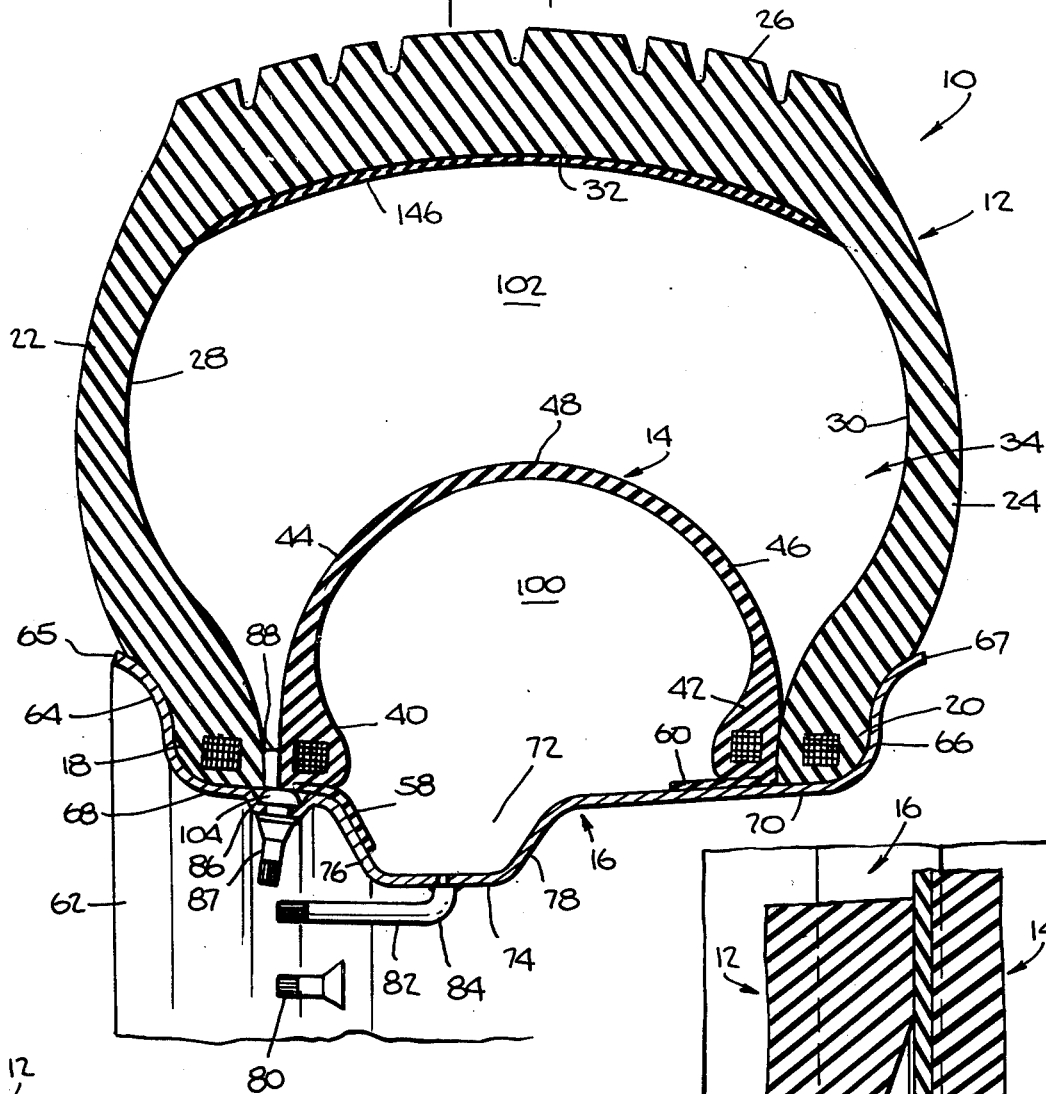

Referring to the drawings a safety tire and rim assembly are generally indicated by reference number 10 in FIG. 1. The assembly 10 comprises a standard tubeless pneumatic tire 12, with a pneumatic insert member 14 both mounted on a standard one piece drop center rim 16.

The pneumatic tire 12 includes spaced annular bead portions 18 and 20 with sidewalls 22 and 24 extending therefrom and a tread portion 26 bridging the sidewalls. Respective inner surfaces 28, 30 and 32 of the sidewalls 22, 24 and the tread 26 define a tire cavity 34. Unless otherwise indicated use of the term tire refers to an FR 78.14 tire.

The pneumatic insert member 14 is of generally toroidal shape and comprises two fabric-reinforced rubber plies 36 and 38 (FIGS. 4 and 5) wrapped around annular insert beads 40 and 42 that are of smaller cross-section than the tire beads 18 and 20. The plies 36 and 38 thus define insert sidewalls 44 and 46, and an insert crown portion 48. The layers of fabric-reinforced rubber are arranged with the cords (not shown) in one layer intersecting the cords of another layer to form an angle in the range of approximately 30° to 90° with the equatorial plane of the tire. The carcass of the insert 14 thus resembles that of a small bias angle or radial pneumatic tire.

The cords can be formed of rayon with a minimum tensile strength of 46 lbs. and 20 to 24 ends per inch to provide a breaking strength of approximately 920 to 1104 pounds per inch. Polyester with a tensile strength of from 47 to 50 lbs. and approximately 22 ends per inch can also be used, and provides a breaking strength of approximately 1034 to 1100 pounds per inch. Other types of fabric such as nylon or a high tensile strength polyamide sold under the designation Kevlar can be used as well.

As shown in FIG. 4 the insert member 14 further includes an outside cover 50 preferably formed of rubber that is less than 0.05 inches thick, an inner diffusion resistant liner 52 preferably formed of chlorobutyl that is less than 0.07 inches thick, and toe strips 54 and 56 around the insert beads 40 and 42. Further use of the term bead is generally intended to refer to the bead area. A pair of annular rings 58 and 60 henceforth called flaps are respectively joined to the outside surfaces of the insert sidewalls 44 and 46.

The flaps 58 and 60 are preferably formed of rubber ranging in thickness from approximately 0.05 inches to 0.1 inches. The type of flap rubber used preferably has a high elongation at break, such as for example above 600% with a modulus at 300% elongation of at least 700 lbs. and a tensile strength of at least 2700 lbs. Lower range values can be used by varying the bead diameter and/or flap thickness.

The inner diameter of the flaps 58 and 60 are preferably from 2 to 3 inches smaller than the diameter of the insert beads 40 and 42. The flaps 58 and 60 also preferably extend approximately 1.5 to 2 inches below the toe strips 54 and 56 (FIG. 4) and need not extend identical amounts. A layer of puncture sealant material, such as disclosed in U.S. Pat. No. 3,981,342, coats the inside surface of the insert member 14.

If desired a tear resistant reinforcement 61 (FIG. 5) can be provided at the insert crown portion 48 extending into the insert sidewalls 44 and 46. The reinforcement 61 can comprise a fabric or wire belt, a high modulus rubber strip placed between the plies 36 and 38, any suitable known specially woven tear resistant fabric such as triaxially woven fabric or chafer fabric, floc-filled rubber covers or thermoplastic or polyurethane layers.

The strength of the tear resistant material can be measured by penetrating the material with a nail with a diameter of 0.16 inches for example, and pulling the nail and material in opposite directions parallel to the plane of the material. The tearing force required to pull the nail a distance of 0.25 inches is measured, since this size hole would deflate an insert member 14 even with puncture sealant. An adequate level of protection is obtained by material requiring a tearing force in excess of 60 lbs. This level of protection can be provided, for example, by four plies of polyester or rayon fabric having cord angles of 50° with the equatorial plane of the tire 12.

The rim 16 comprises an annular tire retaining shell 62 (FIG. 1) having side flanges 64 and 66 with lip end portions 65 and 67 respectively. The shell 62 further includes respective bead support surfaces 68 and 70 spaced by a well portion 72. The well portion 72 has a base 74 and sloping sidewalls 76 and 78 that extend from the base 74 to the bead support surfaces 68 and 70. A standard valve 80 (FIG. 1) is provided in the well sidewall 76, and a standard long neck valve 82 such as used on truck wheels is installed in the well base 74 and provided with a small radius bend 84 to permit clearance between the valve and the wheel hub (not shown).

An annular air passage channel 86 is machined, molded into or otherwise formed on the bead support surface 68, which is shorter in axial length than the bead support surface 70. Although not shown, a slight elevation or hump can be formed in the support surface 68 between the air passage channel 86 and the well sidewall 76. The air passage channel 86 is parallel to the rim flange 64 and spaced therefrom by an axial distance slightly more than the thickness of the tire bead 18 as most clearly shown in FIGS. 8 and 9. An air valve 87 is provided in the rim shell 62 at the base of the air passage channel 86.

An air passage member 88, sandwiched between the abutting tire bead 18 and the insert bead 40 (FIG. 1) comprises a narrow elongated plate 90 approximately two inches long, for example. The plate 90 is formed with through openings 92 and has tapered end portions 94 and 96. The air passage member 88 is formed of any suitable rigid material such as a metal that will not deform or break when subjected to the forces normally present in the bead area of the assembly 10.

Preferably the air passage member 88 is brass or bronze coated and attached to the outer surface of the insert bead 40 in the vicinity of the insert flap 58 in any suitable known manner such as with a rubber bonding agent or cement that is compatible with brass or bronze. The attachment can be made before or after the pneumatic insert member 14 is cured.

Figure 2:
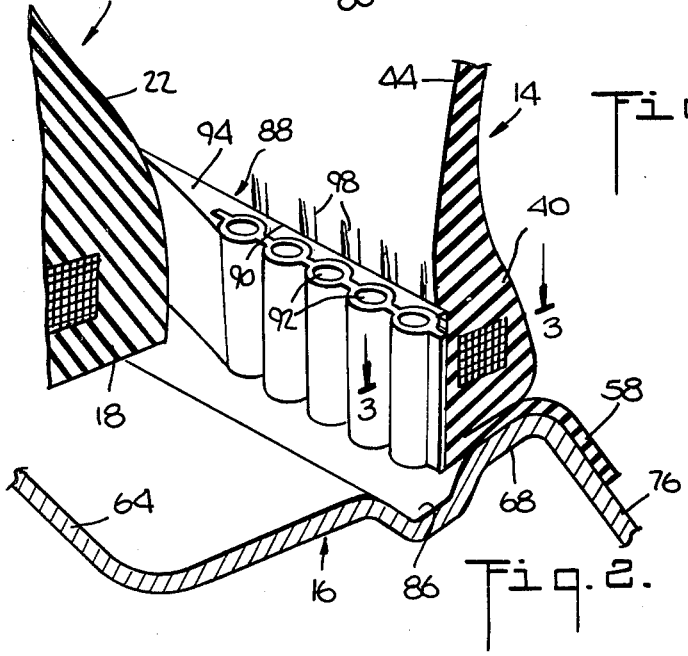
FIG. 2 is an enlarged fragmentary perspective view of a portion thereof.
Figure 3:
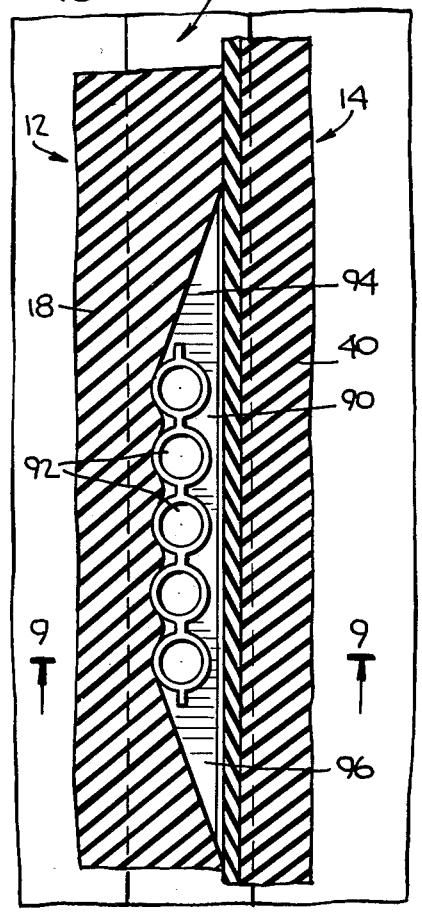
FIG. 3 is a sectional view taken on the line 3—3 of FIG. 2.

The air passage member 88 is positioned on the insert bead 40 with one end of the opening 92 approximately at the level of the bead toe strip 54. The height of the air passage member is approximately equivalent to the contact height between the tire bead 18 and the insert bead 40. If desired, depressions or grooves 98 (FIG. 2) can be formed in the insert bead 40 as continuations of the through openings 92.

In mounting and inflating the assembly 10 the pneumatic insert 14 is placed inside the pneumatic tire 12. The insert flap 58, which is associated with the air passage member 88 corresponds to the rim flange 64 that is positioned toward the outside when the rim 16 is mounted on a vehicle.

The tire and insert beads 18, 20, 40, 42 and the insert flaps 58 and 60 can be lubricated with soap commonly available in any tire shop.

It is well known that the relationship between the bead diameter and the diameter of the bead support surface on the rim is critical. If the bead diameter is oversize, the tire mounting is considerably easier but the tire beads have a relatively loose fit around the bead support surface. This can cause air leakage from the tire and reduces tire stability. If the bead diameter is undersize extremely high tension is developed in the bead area and, during mounting, high shear stresses develop which can cause tearing of the toe strip and turnup plies as well. The risk of bead wire breakage is also present.

It has been found that two beads of exactly the same given diameter mounted simultaneously on a rim designed to accept one bead develop high tensions and effectively act as a single tire bead having a diameter slightly smaller than the given diameter. Therefore, since the beads are inextensible, tearing of the toe strips, plies, flaps and bead wires may result.

To deal with this problem it has been found that damage to the bead area is generally avoided by making the insert bead diameter approximately 0.1 inches larger than the tire bead diameter.

Any suitable known tire mounting machine can be used for assistance in mounting the tire 12 and the pneumatic insert 14. Preferably each tire and insert bead is mounted individually. The tire bead 20 is mounted first, by movement over the lip 65 of the rim flange 64. The flap 60 of the insert bead 42 is then folded up over the rim lip 65 extending toward the rim flange 66 with the insert bead 42 trailing behind. The insert bead 42 is then mounted over the rim flange 65 after the insert flap 60. When the insert bead 42 and insert flap 60 pass from the well portion 72 to the bead support surface 70 the flap 60 engages the well sidewall 78 and is tucked under the insert bead 42 as shown in FIG. 7.

The bead mounting operation is greatly facilitated due to the insert bead 42 being of larger diameter than the tire bead 20. Moreover the insert flap 60 remains virtually unstrained during mounting of the insert bead 42.

In mounting the next insert bead 40 over the lip 65 of the rim flange 64, the insert flap 58 should be lifted to trail the movement of the insert bead 40. The insert bead 40 and the insert flap 58, after passing over the lip 65, are shifted into the well portion 72 to permit the insert flap 58 to extend below the insert bead 40.

The tire bead 18 is then mounted over the lip 65 of the rim flange 64, which enables the tire 12 and insert member 14 to occupy the uninflated mounted position of FIG. 7. The free edges of the insert flaps 58 and 60, in the unmounted position, are smaller in diameter than the respective surfaces 74 and 70, and thus stretch and cling to the surfaces 74 and 70, in the uninflated position to provide a leak tight seal between the flaps 58, 60 and the rim 16.

The valve 80 (FIG. 1) on the well sidewall 76 is usually the only valve present on a standard rim, and in the arrangement of FIG. 7 is substantially blocked by the insert flap 58. Thus the valve 80 cannot be used to deliver air to the inner space of the mounted insert generally referred to as the insert inflation chamber 100. However the long neck valve 82 at the well base 74 has a clear line of communication with the insert inflation chamber 100, and is used to pressurize the chamber 100. Preferably the chamber 100 is initially inflated to approximately the rated inflation pressure of the tire, which is normally less than the rated inflation pressure of the insert.

The initial pressurization of the insert inflation chamber 100 causes the insert beads 40 and 42 to diverge and force the respective tire beads 18 and 20 against the rim flanges 64 and 66. Since the insert bead diameter is approximately 0.1 inches greater than the tire bead diameter, and the insert flaps are approximately 0.05 to 0.1 inches thick the movement of the insert bead 40 in the direction indicated in FIG. 8 causes the insert flap 58 to engage the well sidewall 76 and become tucked under the insert bead 40. The insert flap 58, as well as the insert flap 60, thus fill the gap of approximately 0.05 inches between the insert beads 40, 42 and the bead support surface 68, 70 with the insert flaps 58 and 60 being slightly compressed.

A leak-tight seal is present between the tire bead 18 where it makes surface contact with the insert bead 40 in the partially inflated condition of the insert member 14. The space between the air passage channel 86 and the contacting insert and tire beads 18 and 40 can thus be characterized as an air passage duct 104. The space between the mounted and partially inflated insert member 14 and the inner surfaces 28, 30 and 32 of the mounted tire 12 is referred to as the tire inflation chamber 102.

Due to the abutting force between the tire bead 18 and the insert bead 40 a leak-tight seal exists between the tire bead 18 and the air passage member 88 and between the insert bead 14 and the air passage member 88. One end of the through openings 92 of the air passage member 88 (FIG. 2) communicates with the air passage duct 104 when the insert member 14 is in an inflated or semi-inflated mounted position such as shown in FIG. 1. The opposite ends of the through openings 92 communicate with the tire inflation chamber 102, such communication being aided by the grooves 98 (FIG. 2) in the insert sidewall 44. The tapered end portions 94 and 96 minimize stress concentrations in the bead area due to the presence of the air passage member 88 and also enable the tire bead 18 and insert bead 40 to form a leak-tight seal around the ends of the air passage member 88.

As shown in FIGS. 1 and 10 the valve 87 communicates with the air passage duct 104 and is used to pressurize the tire inflation chamber 102 to its rated pressure, such as 24 psi, after the insert inflation chamber 104 has been inflated to at least this amount. Air passing through the valve 87 enters the duct 104 and passes into the openings 92 of the air passage member 88 for entry into the tire inflation chamber 102. After the tire inflation chamber 100 has been pressurized to its rated level the insert inflation chamber 102 is further pressurized to its rated level.

It will be apparent that the inflation chambers 100 and 102 do not communicate and can thus maintain different pressure levels. The valves 80, 82 and 87 need not be on the same radial section of the rim 16 and since the valve 80 is not essential to the inflation operation it can be eliminated. Although one air passage member 88 is sufficient in most cases for inflation purposes more than one member 88 can be used if desired.

In using the safety tire and wheel assembly 10 assume a fairly large nail 130 has penetrated the tread 26 as shown in FIG. 10. The punctured tire 12 will normally lose pressure from the tire inflation chamber 102 until the inner tread surface 26 contacts the insert crown 48 (FIG. 18A). Depending on its size, the nail 130 may penetrate the insert crown 48 before or after the inner tread surface 32 deflects enough to contact the insert crown 48.

FIG. 18B shows the nail 130 penetrating the insert crown 48 as the tread portion containing the nail contacts the ground. At this time both the tire and insert have substantially the same velocity. However as the tread portion containing the nail moves away from the ground, as shown in FIG. 18C, the tread velocity exceeds the insert velocity and the nail 130 which is trapped in the tread 26 withdraws from the insert crown 48 as shown in FIG. 18D.

Assuming the insert member 14 includes the tear resistant reinforcement 61 of FIG. 5 the nail 130 will not ordinarily tear the insert crown 48 and a puncture sealant material (not shown) coating the interior surface of the insert member 14 will prevent air leakage from the insert inflation chamber 100 as the nail 130 is withdrawn.

Since the insert member 14 resists the tearing force of the nail 130, said nail is forced to progressively bend as shown in FIGS. 18B, C and D, which, along with 18E-I, are a simplified schematic rendition of the dynamics of nail penetration. As shown in FIGS. 18D-I the nail 130 is eventually bent between the insert crown 48 and the inner tread surface 32 until the nail tip no longer penetrates the insert member 14. Since the tear resistant reinforcement 61 extends partially into the insert sidewalls 44 and 46 similar protection is afforded when a nail penetrates marginal areas of the tread 26.

In run-flat testing, wherein the tire inflation chamber is deflated and the insert inflation chamber is at rated pressure supporting a rated load, it is essential that the deflated tire inflation chamber be unsealed to maintain a true run-flat condition. If the tire inflation chamber is kept sealed any residual air therein can build up pressure during vehicle travel. It has been found that even a small amount of tire pressure will cause an increase in mileage endurance over a true run-flat condition and therefore a sealed tire inflation chamber leads to inconsistent test data correlations with a true run-flat condition.

One way of maintaining the tire inflation chamber 102 in a deflated unsealed condition is to drill 4 equally spaced holes of 0.16 inch diameter in the turnup portions of the tire with each sidewall containing two of the holes.

In a run-flat condition, such as shown in FIG. 11, tread and sidewall deformations generate excessive heat eventually resulting in the formation of cracks, separations or tears in and around the sidewalls, the carcass plies and the ply cords. The sidewall deformation cracks in particular limit the run-flat endurance because heat generation is greatest in this area. Once the cracks, tears or separations (hereinafter referred to as cuts) develop they propagate in the circumferential as well as in the radial directions.

The radial cut length can extend from the lower sidewall, at the location of the tire turnups, to the edges of any tread reinforcing belts. The circumferential cuts can extend to more than half the tire circumference. Cuts can start and propagate simultaneously at several locations around the tire circumference, possibly intersecting. Such intersections often result in the formation of a hole.

The rate at which a cut propagates is dependent primarily on the vehicle speed. For example, a one inch cut can grow to three inches after a distance of 25 miles at a speed of 25 miles per hour. However a similar one inch cut can grow the same amount after a distance of 7 miles at a speed of 50 miles per hour.

An arbitrary criteria for failure, used herein, has been the development of a cut measuring 3 to 6 inches in length or the presence of severe vibrations before the cuts reach this size.

Safety tire and wheel assemblies incorporating the present invention were endurance tested supporting a rated load (Tire and Rim Association rating for the tire size) with the tire inflation chamber 102 fully deflated and the insert inflation chamber pressurized to its rated inflation pressure. For example an FR 78.14 tire such as a Uniroyal Zeta 40, PR-6 having two steel belts included an insert member 14 inflated to 40 psi supporting a rated load of 1280 lbs. FIG. 23 shows the safety tire and wheel assembly 10 in a fully inflated unloaded condition and FIG. 24 shows the same system in a run-flat condition at rated load. $S_i$ (FIG. 23) refers to the inflated tire height under no load, and $S_f$ (FIG. 24) refers to the run-flat tire height under rated load. $\delta$ refers to the tire deflection or difference between $S_i$ and $S_f$. The extent to which the tire sidewall deforms and generates heat during run-flat conditions is determined primarily by the size and deflection of the pneumatic insert member relative to the size of the tire.

$S_1$ refers to the tire height measured from the rim flange lips 65, 67 when the tire 12 is under no load. This quantity is also characterized as the tire section height.

$S_2$ refers to the distance between the rim flange lips 65, 67 and the inner surface 32 of the tread 26 when the tire 12 is under no load.

$H_1$ refers to the distance between the insert crown portion 48 and the inner surface 32 of the tread 26 when the tire 12 is under no load.

The dimensions $S_e$, $S_4$, $S_3$ and $H_2$ shown in parenthesis in FIG. 23 refer to dimensions taken on a tire at rated load corresponding to the dimensions $S_i$, $S_1$, $S_2$ and $H_1$.

I refers to the distance between the rim flange lips 65, 67 and the insert crown portion 48 when the tire 12 is under no load. This dimension is approximately the same when the tire 12 is pressurized and supporting a rated load.

The following data was obtained during run-flat testing of the present invention, using an FR 78.14 tire pressurized to 24 psi and a pneumatic insert pressurized to 40 psi:

Data Table

| Insert OD (inches) | $I \text{ (inches)} = \frac{OD \text{ insert} - 14}{2} - 0.71^{(1)}$ | $S_f$ (inches) | $\delta = (S_i - S_f)$ (inches) | $\frac{\delta}{S_1}$ | $\frac{\delta}{S_4}$ | $\frac{\delta - 1.55}{S_4}$ (2) | $H_1 = (S_2 - I)$ (inches) | $\frac{H_1}{S_1}$ | $\frac{\delta - H_1}{S_4}$ | $H_2 = (S_3 - I)$ (inches) | $\frac{H_2}{S_4}$ | $V_i$ insert volume (in³) | $\frac{V_{insert}}{V_{tire}}$ | Test Speed (mph) | Distance (miles) |
|---|---|---|---|---|---|---|---|---|---|---|---|---|---|---|---|
| 18.14 | 1.360 | 2.57 | 3.58 | 0.658 | 0.920 | 0.522 | 3.380 | 0.621 | 0.051 | 1.830 | 0.470 | 429.1 | 0.212 | 25 | 14 |
| 19.57 | 2.075 | 2.66 | 3.49 | 0.642 | 0.897 | 0.499 | 2.665 | 0.490 | 0.212 | 1.115 | 0.287 | 611.3 | 0.303 | 25 | 33⁽³⁾ |
| 19.87 | 2.225 | 2.80 | 3.35 | 0.616 | 0.861 | 0.463 | 2.515 | 0.462 | 0.215 | 0.965 | 0.248 | 659.1 | 0.326 | 45 | 14 |
| 20.05 | 2.315 | 2.84 | 3.31 | 0.608 | 0.851 | 0.452 | 2.425 | 0.446 | 0.227 | 0.875 | 0.225 | — | — | 25 | 28⁽³⁾ |
| 20.40 | 2.490 | 3.05 | 3.10 | 0.570 | 0.797 | 0.398 | 2.250 | 0.414 | 0.218 | 0.700 | 0.180 | 755.9 | 0.374 | 45 | 22 |
| 20.79 | 2.685 | 3.42 | 2.73 | 0.502 | 0.702 | 0.303 | 2.055 | 0.378 | 0.173 | 0.505 | 0.130 | — | — | 45 | 42 |
| 20.89 | 2.735 | 3.63 | 2.52 | 0.463 | 0.648 | 0.249 | 2.005 | 0.369 | 0.132 | 0.455 | 0.117 | 788.3 | 0.390 | — | — |
| | | | | | | | | | | | | | | 45 | 90 |
| 21.65 | 3.115 | 3.79 | 2.36 | 0.434 | 0.607 | 0.208 | 1.625 | 0.299 | 0.189 | 0.075 | 0.019 | 905.1 | 0.488 | 45 to 60 | 210 |

⁽¹⁾Tire and rim Association rim flange height
⁽²⁾Normal deflection of FR 78.14 under rated load
⁽³⁾Test discontinued without failure Tire and Rim Measurements (inches)

Tire OD=26.30 (Tire and Rim Ass'n)
Rim Flange height=0.71 (Tire and Rim Ass'n)
Tire Volume=2020 in$^3$
$S_i$=6.15
$S_e$=4.60
$S_1$=5.44
$S_2$=4.74
$S_3$=3.19
$S_4$=3.89

The difference between the inflated section height of the tire 12 under no load ($S_i$) and the uninflated section height under load ($S_f$) is defined as the run-flat tire deflection ($\delta$), $$\delta = S_i - S_f.$$

$\delta$ can also be expressed in a number of other ways as is apparent from an examination of FIGS. 23 and 24.

The tire portion that contacts the ground in a run-flat condition deflects, thereby deforming the tire sidewall, to generate heat therein and in the tread as well. The tire deflection $\delta$ is essentially determined by the size of the pneumatic insert 14 relative to the size of the tire 12, and the pressure of the insert.

For a given tire size, a large deflection $\delta$ results when a relatively small insert is used. A large deflection $\delta$ also results when a relatively large insert deflects a large amount under load because of a low insert pressure. Conversely a relatively large insert at a relatively high pressure does not deflect significantly under load, resulting in a relatively small run-flat tire deflection $\delta$. Small run-flat tire deflections $\delta$ also enable the tire to run cooler and for longer distances in the run-flat condition.

As shown in FIG. 27, and referring to the data table, run-flat distance is substantially proportional to the ratio of run-flat deflection ($\delta$) over the unloaded section height ($S_1$). For example when a pneumatic insert 14 occupying 39% of the tire volume is used $\delta/S_1=46\%$ and the run-flat distance is approximately 90 miles at a speed of 45 miles per hour. However when a pneumatic insert 14 occupying 30.3% of the tire volume is used $\delta/S_1=64.2\%$ and the run-flat distance is approximately 14 miles at a speed of 45 miles per hour.

It can be seen that a 9% difference in the ratio of insert volume to fixed tire volume has a substantial effect on the run-flat performance. Thus run-flat performance is a critical function of tire deflection. Moreover, it has been found that the governing variable in evaluating such performance is not the volume ratio of insert to tire but the figure $\delta/S_1$ which takes into account not only the pneumatic insert and tire size but the insert pressure and the amplitude of the sidewall deformations. It has been found for example that a change in the insert inflation pressure from 30 to 50 psi serves to reduce the $\delta/S_1$ figure up to 5%. As seen in FIG. 27 a 5% change in the $\delta/S_1$ value will produce a change in run-flat distance endurance of approximately 25 miles. This change is especially dramatic considering that the insert 14 does not grow in any appreciable amount with such a change of inflation pressure. For example the run-flat distance for an insert-tire combination having a volume ratio of 30.3% is 14 miles at 40 psi at a speed of 45 miles per hour whereas the same pneumatic insert inflated to 55 psi has approximately the same volume ratio but a run-flat distance of 28 miles at the same speed.

Based on this data it has been found that a practical pressure range for the pneumatic insert is 30–55 psi cold. Since inflation growth of the insert after 30 psi is negligible, the use of inflation pressures above 50 psi is limited only by the strength of the insert construction. However during run-flat conditions the temperature in the pneumatic insert 14 rises and a small size increase of the pneumatic insert 14 will take place as well as an increase in insert pressure. Both effects normally help the run-flat performance.

Generally an increase in run-flat speed results in a decrease in run-flat distance. For example the run-flat distance is 33 miles at a speed of 25 miles per hour, and only 14 miles at a speed of 45 miles per hour when $\delta/S_1$ is approximately 64% and the ratio of insert volume to tire volume is approximately 30%.

As seen from the graph of FIG. 27, high speed performance at 45 miles per hour improves as the ratio of $\delta/S_1$ decreases. Other factors which effect run-flat distance are general road conditions, ambient temperature, and especially the applied load on the tire 12.

The ride quality in a run-flat condition with the safety tire and wheel assembly 10 is normally so smooth a driver may not become aware that a flat has occurred or is occurring. Eventually when cuts develop in the tire sidewall during travel in the run-flat condition some of the tire rubber may thump or slap against the ground making an audible noise and/or cause vibrations. Large cuts, such as those which measure greater than 6 inches in length often cause severe vibrations because the tire travel, at this point, becomes very irregular between the road and the pneumatic insert member 14.

It is thus desirable to apprise the driver, before the run-flat distance endurance is exhausted, that a flat has occurred or is occurring.

One way of notifying a driver of a flat tire is to fashion an out of round condition 140 into the insert crown 48 at a predetermined location as shown in FIG. 25. The out of round condition 140 will cause mild but noticeable vibrations that serve as a warning to the driver to reduce his speed and prepare to have the tire serviced.

The out of round condition can be provided by superimposing a band of cords 142 on the cords of the insert plies 36 and 38 (FIG. 5), to form a peripheral flatness or a depression extending approximately ⅛ of the insert circumference.

The amount of depression will depend upon the difference in angle between the band cords 142 and the insert plies 36 and 38. A difference of approximately 5° to 25° will furnish sufficient eccentricity to provide adequate warning of the existence of the run-flat condition in most automobiles.

As another alternative a small bump 144 can be provided on the insert crown 48 at a predetermined location such as shown in FIG. 26. The bump 144 is preferably asymmetrical with a long taper 146 at one end and a short taper 148 at the opposite end to provide a noticeable but mild bump effect. The bump 144 which can be about twice as thick as the underlying structure is formed in any suitable known manner such as by a patch of rubber, or an accumulation of a few layers of plies in one section of the insert 14.

During run-flat conditions there is substantial surface friction between the inner surface 32 of the tread and the insert crown portion 48 which friction generates extensive heat in the tread 26. If a 350° F. temperature is reached in the tire cavity in the run-flat condition cuts develop which tend to cool the tire cavity by ventilation. However because the cuts propagate and limit the run-flat endurance it is desirable to retard the formation of cuts and alleviate the heat in the tire cavity by use of a lubricant between the tire 12 and the pneumatic insert 14.

Preferably the lubricant should have a high viscosity to avoid being thrown out of the tire in the run-flat condition, and also be compatible with the materials constituting the tire 12 and the pneumatic insert 14. It has been found that adequate lubricity in the run-flat condition is provided by a lubricant having a viscosity in the range of approximately 8,000 to 12,000 centipoises (cps) at 350° F. However lubricants in this range, such as glycol based lubricants, flow even at room temperature. To deal with this problem, and without affecting the high temperature viscosity, fibrous elements such as asbestos, tire tread grindings containing the cord, and silica are added to polypropylene glycol (ppg). The properties and dimensions are as follows:

| Lubricant with Fibrous Elements | | |
|---|---|---|
| | By weight | Length (inches) |
| Ppg | 160 | — |
| Ground Rubber } | 12.2 | 0.005–0.040 |
| Tire Cords | | |
| Asbestos | 2.8 | 0.020–0.300 |
| Silica | 5.0 | fine powder |

The viscosity of this mixture at 350° F. is 10,000 centipoises and can be spread on the tire liner at room temperature. The fibrous elements mixed in the Ppg form long chains and interconnecting networks. A total amount of 250 to 400 grams is used on a FR 78.14 tire. As the tire rotates in the inflated condition the centrifugal forces tend to spread the mixture into a band 146 (FIG. 1) 4 to 5 inches wide at the inner surface 32 of the tread. If there are inherent imbalances in the tire the band 146 distributes in a direction tending to correct the imbalance. The distribution of the band 146 ceases after approximately 1 hour of travel at 50 miles per hour. The band 146 then remains in place on the inner surface 32 of the tread without further flow and without noticeably affecting the tire balance for the remainder of the tire life. Other fibrous materials can be used in addition to or in place of the above formulation such as disclosed in British Pat. Nos. 1,435,915, 1,443,929 and U.S. Pat. No. 3,946,783.

In addition to its lubricating characteristics, the band 146 also functions as a puncture sealant. For example, holes having a diameter of 0.14 inches drilled into the tread 26 are sealed by the band 146. Since the fibrous elements in the band 146 also form a seal around nails the band 146 can be characterized as a lubricant/sealant. In the event that a nail puncture causes air at 40 psi to escape from the insert member 14 into a deflated tire inflation chamber, a pressure of approximately 16 to 21 psi will develop in the tire.

Thus in some instances the band 146 will permit secondary reinflation of the tire.

As an alternative to the lubricant band 146, a plurality of lubricant pouches 122 (FIGS. 19-22) can be joined to the insert sidewalls 44 and 46 near the insert crown 48. A typical pouch 122 is made of rubber or cord reinforced rubber material and has a tapered profile with a slit-like opening 124 formed at one end. The pouch 122 can be cured with the insert member 14 or bonded in place after the insert member 14 has been cured.

A suitable arrangement as shown in FIG. 19 is to stagger the pouches 122 at symmetric 90° intervals on one or both of the insert sidewalls 44, 46 with the slit 124 pointing in the normal direction of rotation. After the pneumatic insert 14 is placed inside the tire 12 prior to the mounting procedure previously described, a suitable lubricant contained in a bag 126, such as formed of polyethylene for example, is disposed into each pouch 122 through the slit opening 124. The lubricant content of each bag 126 is approximately 100 grams.

Rotation of the insert member 14 in the direction indicated in FIG. 19 will tend to force the bag 126 into the pouch 122 away from the slit opening 124. A suitable known cement can also be used to maintain the bag 126 in the pouch 122. The pouches 122 and the lubricant bags 126 constitute substantially equivalent weights symmetrically distributed around the circumference of the pneumatic insert 14 so as to minimize or eliminate any imbalance that might be due to their presence.

The pouches 122 are placed at the insert sidewalls to prevent their contact with the inner surface 32 of the tread in the event of a significant tread deflection that is attributable to circumstances other than a run-flat condition, such as a road bump that causes the tread 26 to deflect against the insert crown 48.

When a run-flat condition does occur, as shown in FIG. 22, the inner surface 32 of the tread deflects against the insert crown 48 and the pouches 122 causing the lubricant bags 126 to dispense the lubricant through the slit opening 124 onto the contacting tire and insert surfaces.

Preferably the pouches 122 are not placed on the inner surface 32 of the tread because of greater imbalance problems that can arise in that region. In addition the pouches 122, if located at the inner surface 32 will increase power consumption, and be exposed to the constant flexing cycle and heat generation of the tread 26 which would cause untimely expulsion of the lubricant from the bags 126.

Although run-flat failure is arbitrarily considered to occur when a tire cut has propagated to a length of 3 to 6 inches the pneumatic insert 14 rarely fails. Circumstances which give rise to a failure of the pneumatic insert 14 are the depletion of lubricant in the tire causing the temperature at the inner surface face 32 and the insert crown 48 to be excessive, or an exposure of steel belting in the tire which can cut into an unprotected sidewall area of the insert.

Another embodiment of the pneumatic insert member is identified by reference number 106 in FIG. 6. The pneumatic insert member 106 comprises a single fabric reinforced rubber ply 108 having relatively long turnups 109 and 110 around the insert beads 40 and 42. A shorter second ply 112 overlaps the turnups 109 and 110 at the insert crown portion 48 extending partly into the insert sidewalls 44 and 46. An advantage of the pneumatic insert 106 is its use of less material than the pneumatic insert 14. Also the bead diameter is increased by an amount equivalent to the thickness of two plies.

A further embodiment of the pneumatic insert member is identified by reference number 114 in FIG. 15. The pneumatic insert member 114 includes the components of the insert member 14 plus a filament wound protective cap 116 joined to the crown portion 48 and extending partly down the insert sidewalls 44 and 46. The protective cap 116, which is of non-pneumatic character, comprises a rubber extruded cord 118 of approximately 0.25 inch diameter wound in sinusoidal fashion with a phase angle difference between overlapping layers of the cord 118 as shown in FIG. 16 to provide a honeycomb pattern such as disclosed in U.S. Pat. Nos. 3,568,286, 3,730,244 and 3,730,794. This arrangement is characterized as semirigid. An advantage of this system is that the non-pneumatic protective cap 116 can deflect or otherwise prevent a long nail from reaching the insert inflation chamber. Therefore, puncture sealants or other means of protection such as fabric reinforcements are not necessary for the pneumatic insert 114.

If desired the winding pattern can be varied to form other geometrical arrangements such as a rhomboid pattern of rubber extruded cords 120 in FIG. 17.

The filament wound protective cap has all the advantages of a non-pneumatic run-flat device without the disadvantages of excess weight, roughness of ride, loss of tire stability, excess heat generation, mounting difficulty around a rim, and the requirement of specially designed rims or split rims.

The filament wound structure can be built as a separate cap or ring and left uncured. The pneumatic insert member carcass can then be shaped and expanded into this ring and the combination cured together. The filament cap can also be wound directly on the uncured and unexpanded carcass of the pneumatic insert. The same pantographing law applies to the carcass cord angle as well as the winding cord angle permitting the system to be cured together.

To reduce the shear force on the outermost layer of cords of the filament wound cap in the run-flat condition, a layer of rubber can be placed over the whole structure.

Two factors that affect the performance of the filament wound cap are its static spring constant (the rate of change of load with deflection) and the filament thickness. It is desirable to have a high spring constant and a small filament thickness both of which reduce the heat generation. The spring constant $K_f$ is controlled by the closeness and angle of the winding pattern, the direction of the columns and the thickness and modulus of the rubber used, for example. A suitable range for the spring constant is $600 < K_f < 2500$ lbs./in.

However a wider range of spring constant $K_f$ can be used because the pneumatic insert has its own spring constant $K_p$ which can vary with inflation pressure. The filament wound cap normally has a higher power consumption and heat generation than the pneumatic insert. Therefore it is beneficial to provide $K_f < K_p$.

The desirable thickness $t_f$ of the filament wound cap must be a compromise because if it represents a large percent of the section height I of the overall insert (FIG. 23) it will run hot and if it is too thin it loses its effectiveness against nail penetration. A suitable range is $0.1 \, I < t_f < 0.7 \, I$.

An effective tear protection system is provided by the use of a thin filament wound cap $t_f < 0.20 \, I$ with puncture sealant on the insert liner and any suitable crisscrossing pattern that covers the surface of the pneumatic substructure.

Figure 12:
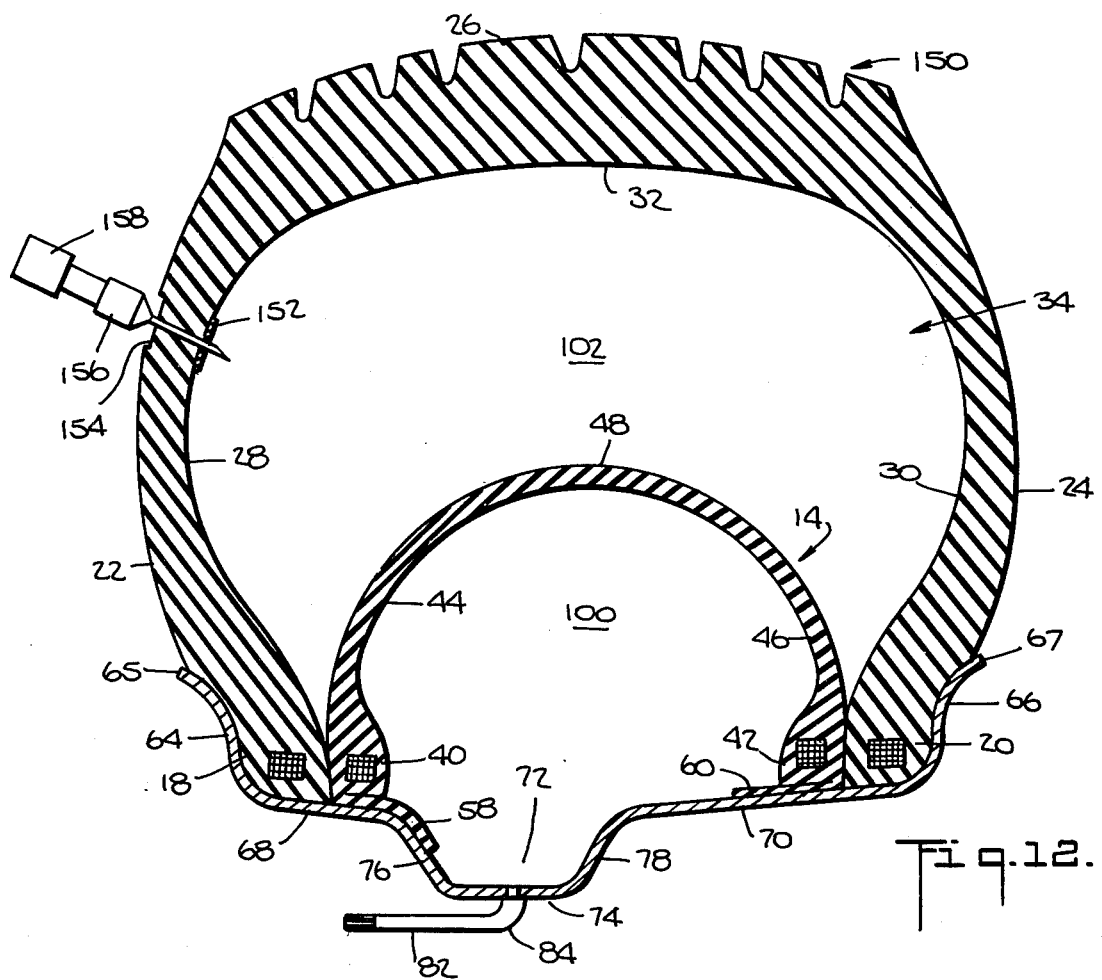
FIGS. 12 and 13 show other embodiments of the invention.

Another embodiment of the safety tire and rim assembly is generally indicated by reference number 150 in FIG. 12. The assembly 150 includes a small area of puncture sealant 152 at the sidewall surface 28, registering with an indentation 154 or other suitable indicator on the outer sidewall 22. The assembly 150 otherwise differs from the assembly 10 in FIG. 1 by an elimination of the valves 80, 87, the air passage member 88 and the air passage duct 104 in the bead support surface 68. An 18 or 20 gauge hypodermic needle 156 welded in tandem to the stem of a tire valve 158 is used to inflate the tire inflation chamber 102 after the pneumatic insert and the tire have been mounted as previously described, and the insert inflation chamber has been partly inflated. The needle valve device 156-158 can also be used to check the tire inflation pressure.

Figure 13:
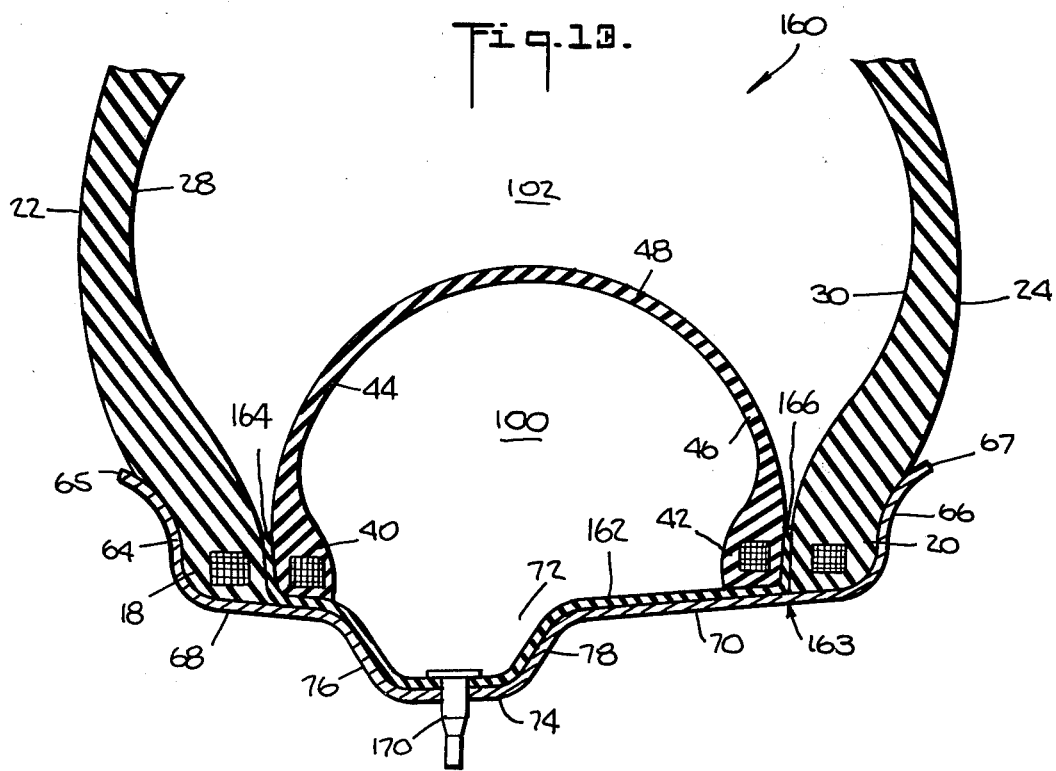

A further embodiment of the safety tire and rim assembly is generally indicated by the reference number 160 in FIG. 13. The assembly 160 includes a layer of rubber 162 molded and cured to the contour of a standard rim 163 without the air passage duct 104. The rubber layer 162 includes edges 164 and 166 that can be raised between respective pairs of the tire and insert beads 18, 40 and 20, 42, or bonded to the insert beads 40 and 42 by a cold vulcanization process known in the retreading industry.

A valve 170 is joined to the rubber layer 162 in any suitable known manner and extends from an opening 170 in the rim. Puncture sealant or any other suitable known means can be placed on the insert liner before the rubber layer 162 is attached to the insert beads 40 and 42. The rubber layer 162 also serves to seal the insert beads 40 and 42 against the bead support surfaces 68 and 70. The valve 170 replaces the valve 82 to inflate the insert and need not be in air-tight engagement with the rim. The tire cavity can be inflated by the needle valve device 156-158.

It should be noted that the rubber layer 162 need not be bonded to the insert beads 40 and 42 but can be slipped around the rim before mounting the tire and the insert. The rubber layer edges 164 and 166 would then be positioned between the respective insert and tire beads 18, 40 and 20, 42 and held in place by the pressure in the insert inflation chamber 100.

Although the tire 12 has been characterized as a radial tire, the invention can also be practiced with any suitable standard bias ply tire.

Some advantages of the present invention evident from the foregoing description include a safety tire and wheel assembly that can be mounted on a standard rim, modified to include at least one extra valve. Any suitable standard radial or bias ply tire can be used. The pneumatic insert member 14 with the flaps 58 and 60 help seal and isolate the insert inflation chamber 100 from the tire inflation chamber 102 without adhesives or special rim modifications.

Because the inner flap diameter is smaller than the rim diameter, the flaps 58 and 60 normally cling to the well portion 72 and bead support surfaces 74 and 70 during mounting to provide a substantially sealed insert inflation chamber 102 even before said chamber has been fully inflated. Since the flaps 58 and 60 are placed on the outer sidewall surfaces of the insert and tuck under the insert beads 40 and 42 they contact the bead support surfaces 68 and 70 and the well portion 72 over a wide area and provide an effective leak-tight seal. As the insert flaps 58 and 60 tuck under the insert beads 40 and 42, they also function as rubber sealing gaskets and can be used on any known tire rim regardless of the bead seat or rim flange design.

The fact that the pneumatic insert member 14 is at a higher inflation pressure than the tire 12 helps maintain the insert beads 40, 42 against the tire beads 18, 20 without any mechanical retaining devices or special rim formations. The insert flaps 58, 60 enable the insert beads 40, 42 to be made larger in diameter than the bead support surfaces 68, 70 which facilitates the mounting operation and helps to prevent damage around the bead wires.

Another advantage of the present invention is the improvement in ride performance. It is well known that when an automobile makes a turn, a lateral force is applied to the tire tread, and the beads exert a reaction force to maintain the tire on the rim. A stiff, tight-fitting bead construction, improves the cornering performance of the tire. One way to stiffen the bead is to increase the inflation pressure which is the main force pushing the bead against the rim flange. However a larger inflation pressure than the recommended value adversely affects other tire properties such as roughness of ride, etc.

When the pneumatic insert 14 is present, it has an inflation pressure higher than that of the tire and contacts the tire only in the bead area. Thus the pneumatic insert 14 provides greater forces than are normally present in a tire without the insert 14 to push the tire beads 18 and 20 against the rim flanges 64 and 66. The safety tire and wheel assembly 10 thus provides improved cornering, maneuverability, and steering response.

A further advantage of the present invention is the improvement in power consumption. If two identical tires, one with the pneumatic insert 14 and one without the pneumatic insert are both inflated to the same inflation pressure it will be found that the power consumption of the tire with the pneumatic insert 14 is less than that of the tire without the insert. The pressure of the tire with the insert, during running, normally exceeds by one or two psi, the pressure of the tire without the insert. This is due to the fact that centrifugal forces tend to expand the insert slightly thus reducing the volume of the tire inflation chamber thereby increasing tire pressure.

The increased tire pressure reduces sidewall deflections and permits the tire to run cooler. It is well known that power consumption decreases as inflation pressure increases. As shown in FIG. 28 the power consumption of a tire containing the pneumatic insert 14 (occupying approximately 45% of the tire cavity) is less at all speeds than that of a tire without the insert 14. The improvements are approximately 4 to 12%.

As various changes could be made in the above constructions without departing from the scope of the invention, it is intended that all matter contained in the above description or shown in the accompanying drawings shall be interpreted as illustrative and not in a limiting sense.

In view of the above it will be seen that the several objects of the invention are achieved and other advantageous results attained.

What is claimed is:

1. In combination, a pneumatic tire and a wheel rim upon which the tire is supported, said wheel rim having an axis and an annular support surface extending laterally in the direction of the axis and a pair of axially spaced apart annular flanges joined to and extending radially outward from said support surface, said tire having a pair of axially spaced apart annular beads each in engagement with one of said flanges and the support surface with a pair of sidewalls each joined to and extending generally radially outward from the beads, and a tread joined to the radially outward ends of the sidewalls, said tread and sidewalls having continuous inner surfaces such that said tire and said wheel rim support surface form a closed toroidal tire cavity, a generally toroidal shaped hollow pneumatic insert member disposed within said tire cavity on the support surface of said wheel rim to define an insert inflation chamber inflatable to a first predetermined rated inflation pressure and a tire inflation chamber in said tire cavity between said tire and said insert member, said insert comprising, a generally toroidal shaped hollow member having a pair of annular insert beads, each said insert bead being axially spaced apart a predetermined amount on said support surface, said insert having an unconnected open portion between said insert beads, said insert beads having a diameter greater than the diameter of the support surface, a pair of insert sidewalls, each joined to and extending generally radially outwardly from said insert beads and an insert crown portion joined to the radially outward ends of the insert sidewalls, the sidewalls of said insert having inner and outer wall surfaces and an annular flap portion joined to each said outer sidewall surface of the insert between the insert bead and the insert crown and extending beyond each insert bead a predetermined amount for tucking between the respective insert beads and the wheel rim support surface to overlay the support surface, the flap thickness and insert bead diameter being predetermined to ensure formation of a leak-tight seal between the insert beads and the support surface when respective said flaps are tucked between respective said beads and the support surface, said insert inflation chamber being noncommunicable with said tire inflation chamber to permit said tire inflation chamber to be pressurized to a second predetermined rated inflation pressure different from the first predetermined rated inflation pressure of the tire, said insert member having a radially outward crown portion spaced from the inner surface of the tire tread where the tread contacts a road surface, said tire having a no-load section height measured from the road contacting tread portion to the wheel rim flange when the tire is at said second predetermined rated inflation pressure and not supporting a load, said tire having a rated load section height measured from the road contacting tread portion to the wheel rim flange when the tire is at said second predetermined rated inflation pressure and is supporting its rated load, and a run-flat section height measured from the road contacting tread portion to the wheel rim flange when the tire air chamber is deflated and said insert air chamber is at said first predetermined rated inflation pressure, said insert having a predetermined size range relative to the tire wherein the difference between the no-load section height and the run-flat section height is approximately 43% to 64% of the no-load section height.

2. The combination of claim 1 wherein said insert crown portion is spaced from the inner surface of the tire tread a distance of approximately 2% to 29% of the rated load section height when the tire is supporting its rated load in a static condition.

3. The combination of claim 1 wherein said insert crown portion is spaced from the inner surface of said tire tread approximately 2 inches to 3 inches when the tire is not supporting a load and is in a static condition.

4. The combination of claim 1 wherein said insert crown portion is spaced from the inner surface of said tire approximately 0.1 inches to 1.12 inches when the tire is supporting its rated load in static condition.

5. The combination of claim 1 wherein the road contacting tread portion deflects approximately 60% to 90% of the rated load section height when the tire is supporting its rated load in static condition and the tire air chamber is deflated.

6. The combination of claim 1 wherein said insert air chamber has a volume of approximately 30% to 45% of the volume of said tire cavity when the tire is not supporting a load and is in a static condition.

7. The combination of claim 1 wherein the insert crown portion is spaced from the inner surface of the tire tread a distance of approximately 29% to 49% of the no-load section height when the tire is in a static unloaded condition, inflated to said second predetermined rated inflation pressure, and the insert member is inflated to said first predetermined rated inflation pressure.

8. A pneumatic insert for a pneumatic tire wherein the tire and insert are arranged to be supported on a wheel rim having an axis and an annular support surface, said insert comprising, a generally toroidal shaped hollow member having a pair of annular insert beads, each said insert bead being axially spaced apart a predetermined amount on said support surface, said insert having an unconnected open portion between said insert beads, said insert beads having a diameter greater than the diameter of the support surface, a pair of insert sidewalls, each joined to and extending generally radially outwardly from said insert beads and an insert crown portion joined to the radially outward ends of the insert sidewalls, the sidewalls of said insert having inner and outer wall surfaces and an annular flap portion joined to each said outer sidewall surface of the insert between the insert bead and the insert crown and extending beyond each insert bead a predetermined amount for tucking between the respective insert beads and the wheel rim support surface to overlay the support surface, the flap thickness and insert bead diameter being predetermined to ensure formation of a leak-tight seal between the insert beads and the support surface when respective said flaps are tucked between respective said beads and the support surface.

9. A pneumatic insert as claimed in claim 8 wherein the crown portion has an inside surface and a layer of puncture sealant material coats said inside surface.

10. A pneumatic insert as claimed in claim 8 wherein the thickness of said flaps is approximately 0.05 to 0.1 inches.

11. A pneumatic insert as claimed in claim 8 wherein said flaps are formed of high elongation rubber.

12. A pneumatic insert as claimed in claim 11 wherein said flap rubber has an elongation above 400%.

13. A pneumatic insert as claimed in claim 8 wherein the sidewalls and crown portion comprise at least one reinforced rubber ply having a cord angle that ranges between approximately 30° and 90° with respect to the equatorial plane of the tire.

14. A pneumatic insert as claimed in claim 13 wherein said fabric reinforcement is selected from the group consisting of rayon, polyester, nylon and a high tensile strength polyamide.

15. A pneumatic insert as claimed in claim 8 further including an outer rubber cover and an interior diffusion resistant liner.

16. A pneumatic insert as claimed in claim 8 wherein the inner diameter of the flaps are approximately 2 to 3 inches less than the insert bead diameter.

17. A pneumatic insert as claimed in claim 8 further including an air passage fixture comprising a rigid member having a through opening with two ends and an orifice at each end of said opening, said fixture being joined to an outer surface of one of said insert beads.

18. A pneumatic insert as claimed in claim 13 further including a layer of tear resistant material disposed over the crown portion of said insert and extending into said sidewalls.

19. A pneumatic insert as claimed in claim 18 wherein said tear resistant material is formed of a woven fabric.

20. A pneumatic insert as claimed in claim 13 further including a filament-wound protective cap joined to the exterior crown portion of said insert.

21. A pneumatic insert as claimed in claim 20 wherein said protective cap comprises a rubber extruded cord wound in overlapping fashion upon itself with a phase angle difference between each overlapping cord layer to provide a honeycomb pattern of said cord on said crown portion.

22. A pneumatic insert as claimed in claim 21 wherein the filament-wound protective cap has a sinusoidal winding pattern.

23. A pneumatic insert as claimed in claim 21 wherein the winding pattern is rhomboid.

24. A pneumatic insert as claimed in claim 8 wherein said crown portion is formed with an out of round condition over a predetermined peripheral zone of said insert crown to function as a run-flat warning device.

25. A pneumatic insert as claimed in claim 24 wherein said out of round condition is a substantially flattened portion.

26. A pneumatic insert as claimed in claim 24 wherein said out of round condition is a generally concave depression.

27. A pneumatic insert as claimed in claim 24 wherein said out of round condition is a bump of predetermined height formed on said insert crown.

28. A pneumatic insert as claimed in claim 27 wherein said bump has opposite ends in the direction of rotation of said insert crown one said end having a long taper to said insert crown, and the other said end having a short taper to said insert crown.

29. A pneumatic insert as claimed in claim 8 wherein said annular flap portions are joined to close the unconnected open portion between said insert beads whereby said pneumatic insert is in the shape of a closed toroid.

30. A pneumatic insert as claimed in claim 8 wherein an inflation valve is provided on the joined flap portions.

31. In combination with a pneumatic tire and a wheel rim upon which the tire is supported said wheel rim having an axis and an annular support surface extending laterally in the direction of the axis of the wheel rim and a pair of axially spaced apart annular flanges joined to and extending radially outward from said support surface, said tire having a pair of axially spaced apart annular beads each in engagement with one of said flanges and the support surface with a pair of sidewalls each joined to and extending generally radially outward from the beads, and a tread joined to the radially outward ends of the sidewalls, said tread and sidewalls having continuous inner surfaces such that said tire and said wheel rim support surface form a closed toroidal tire cavity, a generally toroidal shaped hollow insert member disposed within said tire cavity, and having a pair of axially spaced apart annular insert beads respectively arranged to bear against respective said tire tire beads, said insert beads having an innermost diameter greater than the diameter of the support surface next to the tire bead, said insert having an unconnected open portion between said insert beads, a pair of insert sidewalls spaced from said tire sidewalls, each said insert sidewall having inner and outer wall surfaces and being joined to and extending generally radially outwardly from the insert beads, an insert crown portion spaced from the radially inward surface of the tread, said insert crown portion being joined to the radially outward ends of the insert sidewalls, and an annular flap portion joined to each outer sidewall surface of the insert between the insert bead and the insert crown and extending beyond each insert bead a predetermined amount for tucking between the respective insert beads and the wheel rim support surface and overlaying the support surface, the flap thickness and the insert bead diameter being predetermined to ensure formation of a leak-tight seal between the innermost diameter portion of the insert beads and the wheel rim support surface when respective said flaps are tucked between respective said insert beads and the wheel rim support surface to define an insert inflation chamber inflatable to a first predetermined rated inflation pressure and a tire inflation chamber in said tire cavity between said tire and said insert member, noncommunicable with said insert inflation chamber and inflatable to a second predetermined rated inflation pressure different from the first predetermined rated inflation pressure.

32. The combination of claim 31 wherein said insert member is independently separable from said tire.

33. The combination of claim 31 wherein said rim includes an air passage channel formed in the support surface, extending a predetermined number of degrees of revolution around said support surface such that said channel follows the curvature of said rim in substantially parallel relationship with one of said annular flanges on said rim, at a predetermined distance from said one annular flange.

34. The combination of claim 33 further including an air passage fixture comprising a rigid member having a through opening with two ends and an orifice at each end of said opening, said fixture being sandwiched between one of said tire beads and one of said insert beads arranged to bear against said one tire bead, one of said orifices communicating with said air passage channel when said one of said tire beads is disposed against one of said rim flanges and said one of said insert beads, with its associated flap tucked thereunder, abuts against said one tire bead, the other said orifice communicating with said tire inflation chamber.

35. The combination of claim 34 wherein a first inflation valve member is provided on said wheel rim to communicate with said air passage channel to enable air to pass through said air passage fixture into said tire inflation chamber.

36. The combination of claim 33 wherein said air passage channel extends 360° around said support surface.

37. The combination of claim 34 wherein said air passage fixture includes a plurality of said through openings.

38. The combination of claim 34 including a plurality of said air passage fixtures.

39. The combination of claim 31 wherein the innermost diameter of said insert bead is approximately 0.1 inches larger than the diameter of the support surface for the tire bead.

40. The combination of claim 31 wherein the support surface of said rim includes a well portion bridged by said insert member when said tire beads abut said rim flanges and said insert beads abut said tire beads whereby said insert inflation space encompasses said well portion, and a second air valve member is provided at the exterior bottom portion of said well for communication with said insert inflation chamber.

41. The combination of claim 31 wherein said tire has a sidewall, with a predetermined inner portion of said sidewall coated with puncture sealant material and an indicator on an outside portion of said sidewall corresponding to the location of puncture sealant on the inner sidewall.

* * * * *